United States Patent
Taylor

(10) Patent No.: US 9,558,051 B1
(45) Date of Patent: Jan. 31, 2017

(54) INTER-PROCESS COMMUNICATION ROUTER WITHIN A VIRTUALIZED ENVIRONMENT

(71) Applicant: Bromium, Inc., Cupertino, CA (US)

(72) Inventor: Adrian Taylor, Cambridge (GB)

(73) Assignee: Bormium, Inc., Cupertino, CA (US)

( * ) Notice: Subject to any disclaimer, the term of this patent is extended or adjusted under 35 U.S.C. 154(b) by 342 days.

(21) Appl. No.: 13/872,994

(22) Filed: Apr. 29, 2013

Related U.S. Application Data

(63) Continuation-in-part of application No. 13/115,354, filed on May 25, 2011, now Pat. No. 8,972,980, and a continuation-in-part of application No. 13/223,091, filed on Aug. 31, 2011, now Pat. No. 8,752,047, and a continuation-in-part of application No. 13/302,123, filed on Nov. 22, 2011, and a continuation-in-part of application No. 13/419,345, filed on Mar. 13, 2012, and a continuation-in-part of application No. 13/358,434, filed on Jan. 25, 2012.

(60) Provisional application No. 61/349,717, filed on May 28, 2010.

(51) Int. Cl.
G06F 9/54 (2006.01)
G06F 9/455 (2006.01)

(52) U.S. Cl.
CPC .................................. G06F 9/546 (2013.01)

(58) Field of Classification Search
None
See application file for complete search history.

(56) References Cited

U.S. PATENT DOCUMENTS

| | | |
|---|---|---|
| 6,948,044 B1 | 9/2005 | Chandrasekaran |
| 7,171,523 B2 | 1/2007 | Yamasaki |
| 8,146,084 B1 | 3/2012 | Meketa |
| 8,346,727 B1 | 1/2013 | Chester et al. |
| 8,543,641 B2 | 9/2013 | Cherukuri et al. |
| 2004/0128670 A1 | 7/2004 | Robinson et al. |
| 2005/0149726 A1 | 7/2005 | Joshi et al. |
| 2006/0101189 A1 | 5/2006 | Chandrasekaran et al. |
| 2006/0136910 A1 | 6/2006 | Brickell et al. |
| 2006/0143617 A1 | 6/2006 | Knauerhase et al. |

(Continued)

FOREIGN PATENT DOCUMENTS

WO 2008073618 A2 6/2008

OTHER PUBLICATIONS

Wikipedia, "Virtual Network Computing", URL:en.wikipedia.org/wiki/Virtual_Network_Computing, last modified on Feb. 4, 2014, Printed on Feb. 4, 2014, 5 pages.
Wikipedia, "Remote Desktop Protocol", URL:en.wikipedia.org/wiki/Remote_Desktop_Protocol, last modified on Jan. 20, 2014, Printed on Feb. 4, 2014, 6 pages.

(Continued)

*Primary Examiner* — Eric C Wai
(74) *Attorney, Agent, or Firm* — Brokaw Patent Law PC; Christopher J. Brokaw

(57) ABSTRACT

Routing messages in a virtualized environment. A communication that was issued from an application executing on an operating system is intercepted. The communication is intended to be sent to an intended recipient that is executing on, or is a kernel of, the operating system. A determination is made, based upon a policy, whether to forward the communication to the intended recipient or to route the communication to a virtual machine executing upon the same physical device as the application. The policy allows a user to specify what types of information and device resources are available to each application.

23 Claims, 11 Drawing Sheets

(56) References Cited

U.S. PATENT DOCUMENTS

| | | | |
|---|---|---|---|
| 2006/0184937 | A1 | 8/2006 | Abels et al. |
| 2006/0288343 | A1 | 12/2006 | Pallister |
| 2007/0180450 | A1 | 8/2007 | Croft et al. |
| 2007/0192329 | A1 | 8/2007 | Croft et al. |
| 2008/0001958 | A1 | 1/2008 | Vembu et al. |
| 2009/0007242 | A1 | 1/2009 | Subramanian et al. |
| 2009/0119541 | A1 | 5/2009 | Inoue et al. |
| 2009/0165133 | A1 | 6/2009 | Hwang et al. |
| 2009/0172820 | A1 | 7/2009 | Watson |
| 2009/0249472 | A1 | 10/2009 | Litvin et al. |
| 2009/0276783 | A1 | 11/2009 | Johnson et al. |
| 2009/0313620 | A1 | 12/2009 | Sedukhin et al. |
| 2009/0328033 | A1 | 12/2009 | Kohavi et al. |
| 2010/0122343 | A1 | 5/2010 | Ghosh et al. |
| 2010/0235831 | A1 | 9/2010 | Dittmer |
| 2011/0035494 | A1 | 2/2011 | Pandey et al. |
| 2011/0113467 | A1* | 5/2011 | Agarwal ............. G06F 21/6281 726/1 |
| 2011/0173251 | A1 | 7/2011 | Sandhu et al. |
| 2011/0296487 | A1 | 12/2011 | Walsh |
| 2011/0302577 | A1 | 12/2011 | Reuther et al. |
| 2012/0066681 | A1* | 3/2012 | Levy et al. ....................... 718/1 |
| 2012/0089666 | A1 | 4/2012 | Goswami et al. |

OTHER PUBLICATIONS

Wikipedia, "KB Parallels: What is Coherence? Information about Coherence View mode", 1999-2014 Parallels. Virtualization and Automation Software, URL:kb.parallels.com/en/4670, Article ID: 4670, Created on: Apr. 15, 2008, Printed on: Feb. 4, 2014, 7 pages.

* cited by examiner

BLOCKING IPC MESSAGES

MESSAGE ALLOWED BY FIREWALL:

MESSAGE SUPPRESSED BY FIREWALL:

INTER-PROCESS COMMUNICATION ROUTER WITHIN A VIRTUALIZED ENVIRONMENT

CLAIM OF PRIORITY AND RELATED APPLICATION DATA

This application is a continuation-in-part of, and claims priority to, U.S. non-provisional patent application Ser. No. 13/115,354, filed May 25, 2011, entitled "Approaches for Securing an Internet Endpoint using Fine-Grained Operating System Virtualization," the contents of which are hereby incorporated by reference for all purposes as if fully set forth herein.

Note that U.S. non-provisional patent application Ser. No. 13/115,354 claims priority to U.S. Provisional patent application Ser. No. 61/349,717, filed May 28, 2010, the contents of which are hereby incorporated by reference for all purposes as if fully set forth herein.

This application is a continuation in part of, and claims priority to, U.S. non-provisional patent application Ser. No. 13/223,091, filed Aug. 31, 2011, entitled "Approaches for Automated Management of Virtual Machines for Running Untrusted Code Safely," the contents of which are hereby incorporated by reference for all purposes as if fully set forth herein.

This application is a continuation in part of, and claims priority to, U.S. non-provisional patent application Ser. No. 13/302,123, filed Nov. 22, 2011, entitled "Approaches for Efficient Physical to Virtual Disk Conversion," the contents of which are hereby incorporated by reference for all purposes as if fully set forth herein.

This application is a continuation in part of, and claims priority to, U.S. non-provisional patent application Ser. No. 13/419,345, filed Mar. 13, 2012, entitled "Seamless Management of Untrusted Data Using Virtual Machines," the contents of which are hereby incorporated by reference for all purposes as if fully set forth herein.

This application is a continuation in part of, and claims priority to, U.S. non-provisional patent application Ser. No. 13/358,434, filed Jan. 25, 2012, entitled "Approaches for Protecting Sensitive Data Within a Guest Operating System," the contents of which are hereby incorporated by reference for all purposes as if fully set forth herein.

FIELD OF THE INVENTION

Embodiments of the invention relate to an inter-process communication router for use in a virtualized environment.

BACKGROUND

Complex software systems, such as the software running on mobile phones, have multiple software components. Such software systems often communicate via message-passing. Communicating in this manner allows one software component to trigger an action in another component. For example, when a user taps on a particular icon displayed on the screen of a mobile device, the tapping on the icon may be handled by a first application (which is typically termed a "launcher application"). This first application, in turn, may send a message to a second application that is represented by the icon. Upon receiving the message, the second application represented by the icon will launch. This type of message-passing is typically abbreviated as "inter-process communication" or IPC.

There are a variety of reasons for dividing complex software systems into components that communicate via inter-process communication. One such reason is security. Components may be configured to require different levels of access privileges. For example, an email component may be permitted to access a mobile phone network (and consequently render the user liable for monetary charges for accessing the mobile phone network) while another application, such as a calendar application, may not be permitted to access the network. Therefore, if malicious software were to infect the calendar program, the infected calendar program would not be able to cost the user money for using the network.

Certain prior art approaches employ an IPC firewall to secure the interactions between certain software components. FIG. 1 is a block diagram of an IPC firewall according to the prior art. As shown in FIG. 1, an IPC firewall according to the prior art blocks a message from arriving at its destination if the message is denied passage by the firewall. Prior art IPC firewalls reside within the operating system.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Figure 1:
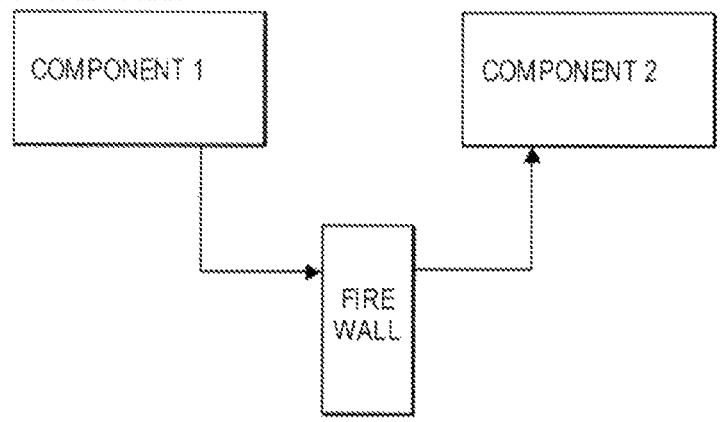
FIG. 1 is a block diagram of an IPC firewall according to the prior art.
Figure 1:
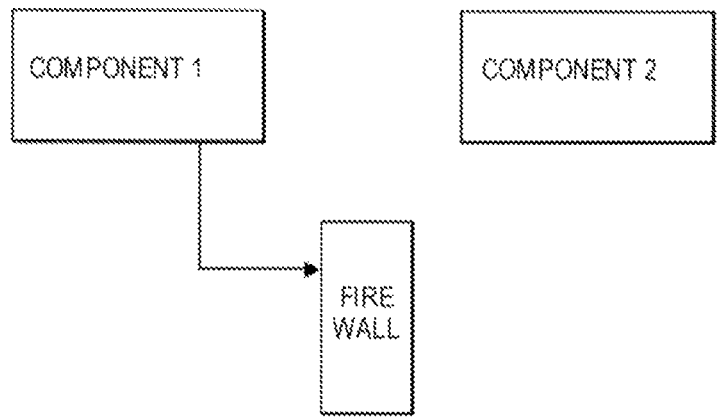

Approaches for an inter-process communication router for use in a virtualized environment are presented herein. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form or discussed at a high level in order to avoid unnecessarily obscuring teachings of embodiments of the invention.

As used herein, the term application refers to any software running above the kernel of the operating system, i.e. user-mode software. Thus, as used herein, the term application would include not only user-visible application tasks, but also system services, middleware, and the like which perform services on behalf of the user, but may not be visible to the user.

Functional Overview

Embodiments of the invention execute certain applications within separate virtual machines in order to isolate them from other software components. Isolating software components from one another promotes a secure operating environment, as a program which has been compromised by malicious code is unable to access any data outside of the virtual machine in which it operates. However, to provide a user experience in harmony with the user's expectations, actions performed in one virtual machine should be able to trigger reactions in other virtual machines when necessary. Embodiments of the invention allow for such interaction to occur in a secure manner.

In an embodiment, a router module intercepts messages issued from a first application executing on a host operating system. The router module may be separate from both the first application and the host operating system. The router module may determine how to route the message by consulting a policy, and thereafter, may cause the message to be routed to either another application executing on the host operating system or to a virtual machine. The virtual machine may be instantiated upon need and may be deinstantiated when no longer required. As shall be described in further detail below, the router module ensures that an application executing in the virtualized environment can only access user data, such as contact and payment instrument information, specifically associated with that application.

Embodiments of the invention have particular utility in certain types of devices, such as a mobile device. For example, certain embodiments may be employed with the Android™ operating system executing on a cell phone. While examples of certain embodiments will be discussed herein with reference to a cell phone running the Android™ operating system, the invention is not limited to any particular type of device (such as a mobile device) and is not limited to any particular type of operating system.

System Overview

Figure 2:
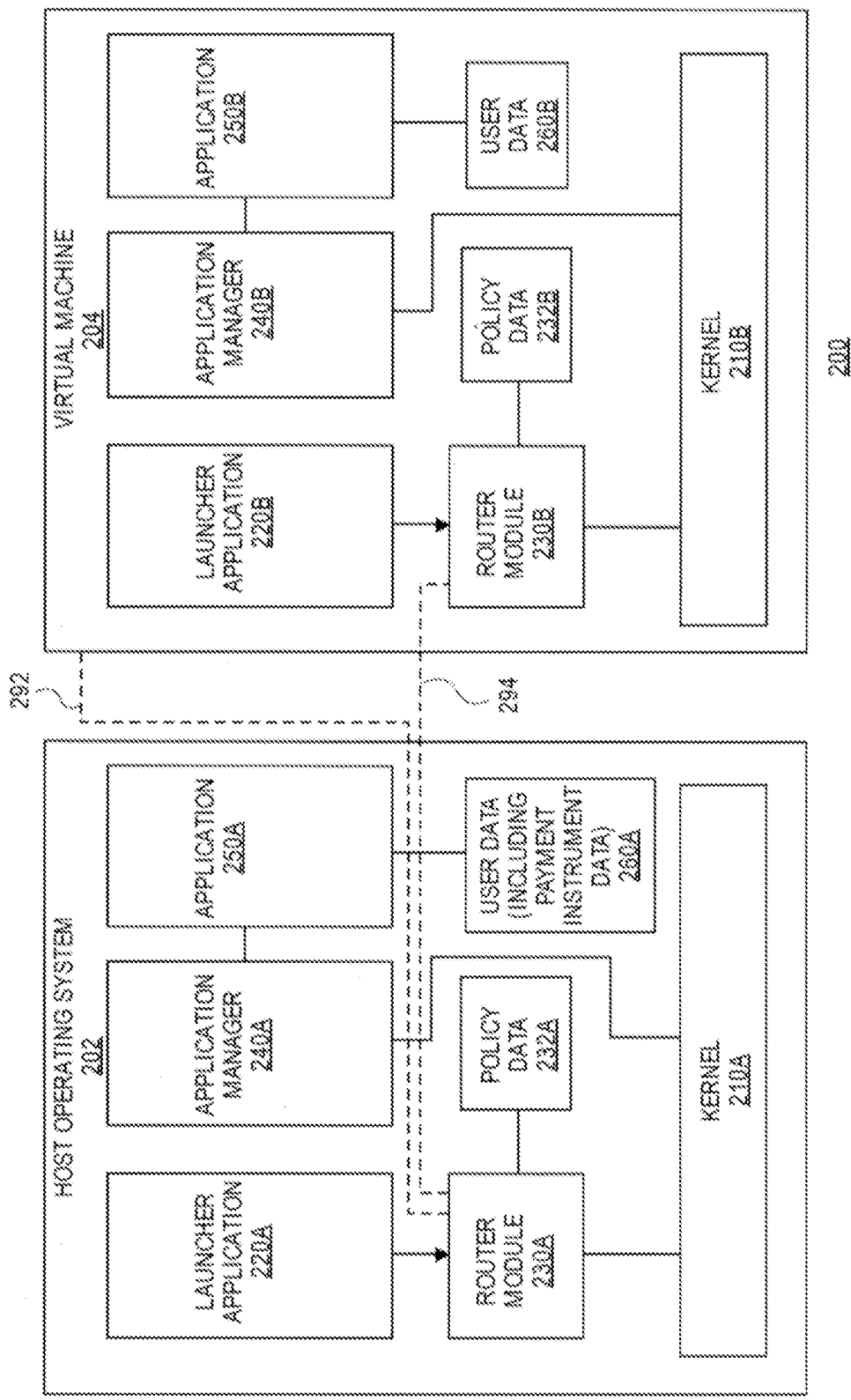
FIG. 2 is a block diagram of a system including a router module according to an embodiment of the invention.

FIG. 2 is a block diagram of a system 200 according to an embodiment of the invention. The example of FIG. 2 depicts system 200 as comprising host operating system 202 and virtual machine 204. The software components of system 200 may be implemented on a variety of devices, such as a mobile phone for example. Further descriptions of the types of devices upon which system 200 may be implemented are described below with reference to FIGS. 4 and 9.

System 200 depicts a single virtual machine, namely virtual machine 204. As shall be explained below, virtual machines may be instantiated and deinstantiated as needed over time in system 200. Consequently, system 200 may include any number of virtual machines, includes zero virtual machines and two or more virtual machines.

FIG. 2 depicts several software components executing on, or as part of, host operating system 202. Each of these components shall be described below. Kernel 210A refers to the kernel of host operating system 202. The kernel of an operation system is the main portion of the operating system which is responsible for managing the resources of the device upon which it executes. Accordingly, kernel 210A is considered to be a part of host operating system 202.

In an embodiment, host operating system 202 may be implemented using Android™ system operating software (OS). Embodiments of the invention are not limited to any particular host operating system, as host operating system 202 may be implemented using a wide variety of operating systems, such as a version of Microsoft Windows operating system (OS), an operating system (OS) designed to run on mobile devices, or any type of OS that supports inter-process communication (IPC).

Launcher application 220A is an application that executes on host operating system 202. Launcher application 220A is an application that is separate and distinct from host operating system 202. In an embodiment, launcher application 220A may be responsible for rendering a user interface, or a portion thereof, on a screen of the device on which it executes. For example, launcher application 220A may be responsible for drawing icons on screen.

Additionally, in an embodiment, launcher application 220A may be responsible for receiving and processing received user input. For example, when a user touches a portion of a screen, the user input describing the user's physical interactions with the screen may be received by launcher application 220A, which in turn, interprets the user input to ascertain where the user tapped on the screen (or what other physical interactions the user performed against the screen). When launcher application 220A determines that the user wishes to launch a particular application (by virtue of the user tapping on an icon associated with the particular application, for example), launcher application 220A will issue a "start activity message" to kernel 210A to request that the particular application be launched.

Router module 230A, as broadly used herein, refers to any software component which is capable of intercepting messages issued from launcher application 220A. The messages intercepted by router module 230A may be intended to be received by another application by way of kernel 210A, e.g., router module 230A may intercept a "start activity message" issued by launcher application 220A. In an embodiment, upon intercepting a message issued from launcher application 220A, router module 230A consults policy data 232A to determine how to route the intercepted message. For example, router module 230A may route an intercepted message to the original destination (such as an application executing on the host operating system) or to virtual machine 204.

In an embodiment, router module 230A may cause a virtual machine to be instantiated, and thereafter cause a desired application to be launched in the newly instantiated virtual machine. To illustrate, assume that prior to router module 230A intercepting a "start activity message" from launcher application 220A, there are no instantiated virtual machines in system 200. In response, router module 230A may cause a virtual machine to be instantiated. FIG. 2 depicts this action as line 292, which depicts router module 230A causing virtual machine 204 to become instantiated. Certain embodiments may instantiate virtual machine 204 to possess characteristics deemed to be well-suited for the application intended to be launched therein, e.g., the specific set of resources available to virtual machine 204 may be determined upon the needs of the application to be executed therein. Additional description of how router module 230A routes messages will be presented below with reference to FIG. 3.

In an embodiment, router module 230A is separate and distinct from launcher application 220A and is not a native component of host operating system 202, although router module 230A is software that executes upon host operating system 202. While FIG. 2 depicts policy data 232A as being stored separately from router module 230A, other embodiments may incorporate policy data 232A as part of router module 230A.

In an embodiment, when kernel 210A receives a "start activity message," kernel 210A performs activity intended to initiate the launch of the application identified in the "start activity message." In certain operating systems, kernel 210A may launch the application itself.

On the other hand, in other operating systems, kernel 210A may instruct another software component to launch an application. Such an embodiment is depicted in FIG. 2. Application manager 240A is intended to represent a software component which is part of host operating system 202 and is responsible for launching applications. For example, in the Android™ operating system, application manager 240A may be implemented as the activity manager component of the Android™ operating system. Application manager 240A is a separate process than kernel 201A and is considered to be part of host operating system 202.

Application 250A, as broadly used herein, is intended to represent any application which may be executed on host operating system 202. The execution of application 250A may be requested by launcher application 220A. For clarity, FIG. 2 depicts a single application; however, practical implementations of embodiments will execute any number of applications at a particular point in time, including zero applications as well as two or more applications.

The user may wish to store personal information in system 200. For example, the user may wish to store a set of contact information for the user's contacts or information about one or more payment instructions, such as a credit card. User data 260A, as broadly used herein, represents any personal data associated with a user that is stored within host operating system 202 that is intended to be private (i.e., non-accessible) to certain processes executing in system 200. While user data 260A may include contact information and payment instrument information, user data 260A may include any type of information associated with a user, such as the user's preferences, usage history, location information (such as but not limited to GPS information, Wi-Fi triangulation data, and a set of accessible networks), diary information (including any notes manually drafted or created by the user or logs automatically created without user involvement that describe activity performed on the device or characteristics of the device), and the like.

It is contemplated that user data 260A will contain sensitive information which the user may wish to prohibit certain types of applications from accessing. For example, the user may not wish to grant access to the user's personal contact address book to a game which the user downloads. On the other hand, the user may expect that an email application can access the contact information of the user's contacts.

Virtual machine 204, depicted in FIG. 2, is intended to represent one of the many virtual machines which may be instantiated, as needed, in system 200. Virtual machine 204 comprises similar components as discussed above with reference to host operating system 202; accordingly, applications executing in virtual machine 204 are unaware that they are not executing on host operating system 202, as applications executing in virtual machine 204 may operate in exactly the same manner as if they were executing within host operating system 202. However, as shall be explained in further detail below with reference to FIG. 3, applications executing in virtual machine 204 cannot access user data 260A, maintained by host operating system 202, unless the application has been expressly granted permission to do so.

Virtual machine 204 comprises many of the same types of software components as host operating system 202. For example, virtual machine 204 executes its own operating system (termed a "guest operating system"). These software components execute similar to those discussed above, except that they operate in virtual machine 204 rather than host operating system 202. To provide a consistent naming convention in FIG. 2, the numerical reference of software components executing on or part of host operating system 202 end in "A," while the numerical reference of software components executing on or part of virtual machine 204 end in "B." For example, kernel 210B is the kernel of the guest operating system comprised within virtual machine 204, while kernel 210A is the kernel of host operating system 210A. Launcher application 220B, application manager 240B, and application 250B operate the same in virtual machine 204 as their counterparts, namely launcher application 220A, application manager 240A, and application 250A do in host operating system.

The content of user data 260B may differ from implementation to implementation, or even from virtual machine to virtual machine. To explain, in an embodiment, user data 260B may correspond to a blank set of data. In another embodiment, user data 260B may correspond to a "dummy" set of data in the sense that the user data contained therein is not associated with the user of system 200, but instead, represents a default set of data provided for purposes of allowing applications to interact with a set of expected data without providing access to any private or sensitive data belonging to the user of system 200.

In another embodiment, user data 260B may correspond to a complete data of user data 260A. This would enable application 250B executing in virtual machine 204 to read the same data as in user data 260A by reading user data 260B; however, any changes made by application 260B to user data 260B will not be persisted once virtual machine 204 is deinstantiated. Such an embodiment may be desirable when the user wishes application 250B to have read access, but not write access, to the actual user data of the user.

In another embodiment, user data 260B may correspond to a proper subset of the data of user data 260A. Such an embodiment may be desirable when the user wishes application 250B to have read access, but not write access, to only a portion of the actual user data of the user.

In another embodiment, user data 260B may function as a live mirror of user data 260A. In such an embodiment, any changes made to user data 260B will need to be affected against user data 260A, and vice-versa.

Having described the nature of the software components depicted in FIG. 2, additional description about how these components interact with one another shall now be presented.

Routing Messages Using an Inter-Process Router

Figure 3:
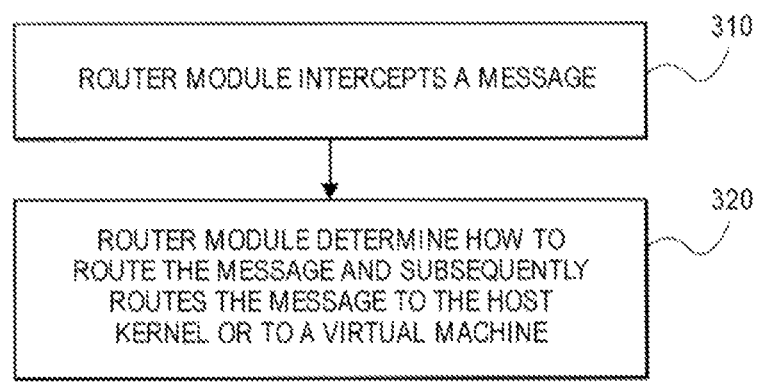
FIG. 3 is a flowchart illustrating the steps of securing routing messages using a router module according to an embodiment of the invention.

FIG. 3 is a flowchart illustrating the steps of routing messages using router module 230A according to an embodiment of the invention. In step 310, router module 230A intercepts a message issued from launcher application 220A and which may be intended by launcher application 220A to be delivered to another application by way of kernel 210A. The intercepted message may be an inter-process communication (IPC) message. Alternately, the intercepted message may be a system call to kernel 210A.

Embodiments of the invention may cause router module 230A to intercept messages issued by launcher application 220A using a variety of different methods. To illustrate one method for doing so, a library file in communication with or comprised within launcher application 220A may be added or updated such that at least a portion of messages (i.e., those meeting certain criteria) that originate from launcher application 220A which are communicated via kernel 230A are instead, routed to router module 230A.

Other approaches for intercepting messages issued by launcher application 220A may be employed. As an example, an embodiment may intercept a message issued by launcher application 220A by modifying the code in kernel 210A responsible for passing messages. In this approach, kernel 210A is modified to perform the functions attributed to router module 230A.

As another example, an embodiment may intercept a message issued by launcher application 220A by using one or more breakpoint instructions or other instructions inserted into the normal flow of the message passing code. Rather than inserting one or more library files, debugging techniques (such as but not limited to breakpoints) may be used to divert the CPU to run different instructions at a given point of execution. Using these techniques, a message issued by launcher application 220A may be intercepted.

As another example, an embodiment may intercept a message issued by launcher application 220A by using existing kernel facilities to intercept system calls or function calls. For the benefit of those writing debugging programs, most operating systems provide the ability to alert a second program when a first program makes a system call. For example, on the Linux operating system, this feature is called 'ptrace.' As all inter-application messages are passed by the kernel, there is always a system call involved; consequently, this mechanism may be used to intercept messages issued by launcher application 220A.

To illustrate another example, an embodiment may intercept a message issued by launcher application 220A using an engine which samples software activity frequently to deduce when launcher application 220A sends a message. Such an approach would involve executing code at a regular interval to check when a message is sent.

As another example, an embodiment may intercept a message issued by launcher application 220A through a simulation of a network across which the messages may be passed. Some messaging mechanisms may pass their messages over a network, rather than between processes, applications, or kernels running on a device. This approach involves producing a simulated network and then configuring applications and the kernel to exchange their messages via the simulated network. By observing activity on the simulated network, one can ascertain when a message is sent and subsequently intercept messages issued from launcher application 220A.

To illustrate another example, an embodiment may intercept a message issued by launcher application 220A using hardware facilities which can monitor normal execution of the processor. Such hardware facilities may include, for example, "secure world" on ARM™ processors or "TPM/TXT" on Intel™ processors; these examples provide a way to execute code in the background. In an embodiment, messaging code may be marked as non-executable and then the "secure world" code may get notified when an entity wishes to execute the messaging code. Instead of allowing that entity to execute the messaging code, alternate code which is used to intercept a message may be executed instead.

An alternative example of how a message issued by launcher application 220A may be intercepted involves the use of pointers, and the like, to refer to alternative code. In certain embodiments, additional instructions may be inserted into the flow of message passing code. Often, the flow of message passing code will involve executing code at a certain memory location identified by a pointer or other mechanism. The pointer (or other mechanism identifying the code to be executed) may be overwritten or updated such that the existing code jumps to code responsible for intercepting the message rather than the original code. The code responsible for intercepting the message may correspond to router module 230A or may operate in conjunction with router module 230A.

In step 320, router module 230A determines how to route the message and subsequently does so. In an embodiment, router module 230A may make such a determination by consulting policy data 232A. Policy data 232A is data that defines one or more policies to determine whether or not an application in system 200 should be executed in host operating system 202 and how messages should be routed in system 200.

Policy data 232A may identify whether a particular application has been deemed a trusted application or not. Policy data 232A may specify that only applications which are deemed trustworthy should be run within host operating system 202, as applications executing in host operating system 202 could gain access to user data 260A. Therefore, policy data 232A may instruct that untrusted applications (i.e., those applications the user does not trust to fully access user data 260A) should be executed within a virtual machine, such as virtual machine 204. An administrator or a user may determine whether a particular application should be trusted, and if so, to what extent; therefore, policy data 232A may be updated to reflect the trust level assigned to that application.

Additionally, policy data 232A may identify whether a file has been deemed trustworthy or not. If an otherwise trustworthy application seeks to open an untrustworthy file, then policy data 232A may instruct that this action is deemed untrustworthy (since the application may be corrupted by malicious code contained within the untrustworthy file), and thereafter may cause the trusted application to open the untrusted file in a virtual machine, such as virtual machine 204.

Policy data 232A may describe one or more policies of different levels of complexity. For example, policy data 232A may describe a policy that determine that an application is trusted to be run on host operating system 202 only if the file in which the application is opening is trusted. In another embodiment, an application may execute on host operating system 202 if the application is deemed trustworthy or a file (or all files if the application is operating or opening multiple files) upon which it is operating or opening is deemed trustworthy.

As a result of the policies defined thereby, policy data 232A may identify whether an application to be launched should be launched within host operating system 202 or a virtual machine, such as virtual machine 204.

Policy data 232A may also identify whether a particular application is able to access any sensitive or private data contained within user data 260A, and if so, exactly what portions of user data 260A the application may access. For example, policy data 232A may indicate that certain applications can access contact data (data describing a user's contacts and their information) stored within user data 260A but cannot access payment instrument data (data identifying one or more payment instruments, such as a credit card or a debit card, of the user). As another example, policy data 232A may indicate that certain applications can access payment instrument data if the user expressly authorizes the application to do so at each occurrence. To illustrate, if the user indicates his or her consent to allow an application to access his or her payment instrument data through a user interface or the like, then policy data 232A may allow the application to do so.

Router module 230A may intercept a "start activity message" that requests the launch of a particular application. In turn, router module 230A may consult policy data 232A to identify whether the particular application is a trusted application. If the particular application is a trusted application, then router module 230A may route the "start activity message" to kernel 210A so that the trusted application may be launched within host operating system 202. Note that kernel 210A may enlist the aid of application manager 240A in launching the trusted application within host operating system 202. As a result, the trusted application, once launched, may correspond to application 250A in FIG. 2.

On the other hand, if the "start activity message" requests the launch of a particular application which policy data 232A deems to be untrusted, then router module 230A routes the "start activity message" to router module 230B over communications route 294 so that the untrusted application may be launched within virtual machine 204. Note that virtual machine 204 need not be instantiated prior to the point when router module 230A determines that the "start activity message" should be routed to router module 230B, as router module 230A may cause virtual machine 204 to be instantiated and thereafter router the "start activity message" to the newly instantiated router module 230B.

Router module 230B will receive and process any "start activity message" routed to it by router module 230A. Router module 230B may forward the "start activity message" to kernel 210B for processing, which may ultimately result in the launching of the untrusted application in virtual machine 204 (the launching of the untrusted application may actually be performed by application manager 240B per the request of kernel 210B in some implementations). The untrusted application, once launched, will correspond to application 250B executing in virtual machine 204 as shown in FIG. 2.

Application 250B executing within virtual machine 204 is prevented from accessing any user data 260A, including but not limited to payment instrument data or contact data contained therein, maintained by host operating system 204 without the assistance of router module 230B. Without the cooperation of router module 230B, application 250B cannot read user data 260A as it resides outside of virtual machine 204. Application 250B is prevented from maliciously using user data 260A, such as by using the user's contact data to access email, social media applications, and incurring network charges.

It may be desirable to allow application 250B to access certain portions of user data 260A. In this case, a request to access user data issued by application 250B may be redirected to router module 230B. Router module 230B may consult data policy, such as policy data 232B, to determine what user data application 250B should be granted access. Note that router module may consult other policy data than policy data 232B in making this determination, e.g., router module 230B may consult policy data stored external to virtual machine 204 (such as policy data 232A) to avoid the possibility that malicious code inadvertently introduced into application 250B could corrupt any policy data stored within virtual machine 204. If router module 230B determines that application 250B should be granted access to at least a portion of policy data 232A on host operating system 232A, then router module 230B may provide application 250B access to user data 232A.

Virtual machine 204 may only be persisted as long as at least one application is executing therein. As system 200 may include any number of virtual machines, in an embodiment, each time an untrusted application is launched, the untrusted application is launched within a separate virtual machine. In such an embodiment, when an untrusted application is closed or otherwise is no longer executing, the virtual machine in which the untrusted application for that untrusted application may be deinstantiated since it is no longer needed. In other embodiments, policy data 232A may instruct that two or more untrusted applications may be executed within the same virtual machine.

Extensions of Policy Data

In an embodiment of the invention, applications may provide transparent access to different sets of user data. In such an embodiment, policy data 232A may identify various sets of one or more applications, and each set of one or more application may be associated with a different set of user data in which the set of applications transparently accesses. In this embodiment, applications cannot access user data associated with a set in which they do not belong.

To illustrate with a particular example, assume that policy data 232A defines a set of one or more "business" applications and a set of one or more "personal" applications. The one or more business applications may be granted access to a set of business user data, whereas the one or more personal applications may be granted access to a set of user data associated with the user's personal life outside of work.

Policy data 232A may indicate that one set of application should be executed in host operating system 202, while the other sets of applications should be executed in one or more virtual machines. For example, if profile data 232A indicates that a particular application is a "personal" application, then this application may be allowed to execute in host operating system 202. In this case, user data 260A corresponds to the user's personal information, and so by executing within host operating system 202, the application may access the appropriate set of user data. On the other hand, if profile data indicates that a particular application is a "business" application, then this application may be caused to execute in virtual machine 204. In this case, user data 260B corresponds to the user's business information, and so by executing within virtual machine 204, the application will access user data 260B, which contains a different set of user data than user data 260A. Note that in other embodiments, policy data 232A may instruct that an application deemed a part of the "business" applications set be executed in host operating system 202, while an application deemed a part of the "personal" applications set is instructed to be executed within virtual machine 204. Consequently, embodiments have no limitation on where policy data 232A instructs a particular application to be executed.

Advantageously, profile data used in this manner may, transparently to the user, provide an appropriate set of user data to each executing application. In this way, if an application is deemed to be a "business" application, then this application may be granted access to a business credit card rather than a personal credit card without any manual instruction or intervention from or by the user.

Note that there is no requirement that user data 260B in virtual machine 204, or even user data 260A in host operating system 202, describes anything at all or anything with any basis in reality, i.e., user data 260B could represent an empty or "fake" address book. Thus, if the user wishes to download and execute an application of unknown veracity, then such an unknown quantity may be executed in virtual machine 204 and have access to only contact data 260B which does not expose any of the user's private or sensitive data, but nevertheless, contains the software artifacts (i.e., address books, contact information, etc.) which certain applications expect.

Architecture of a Client

Figure 4:
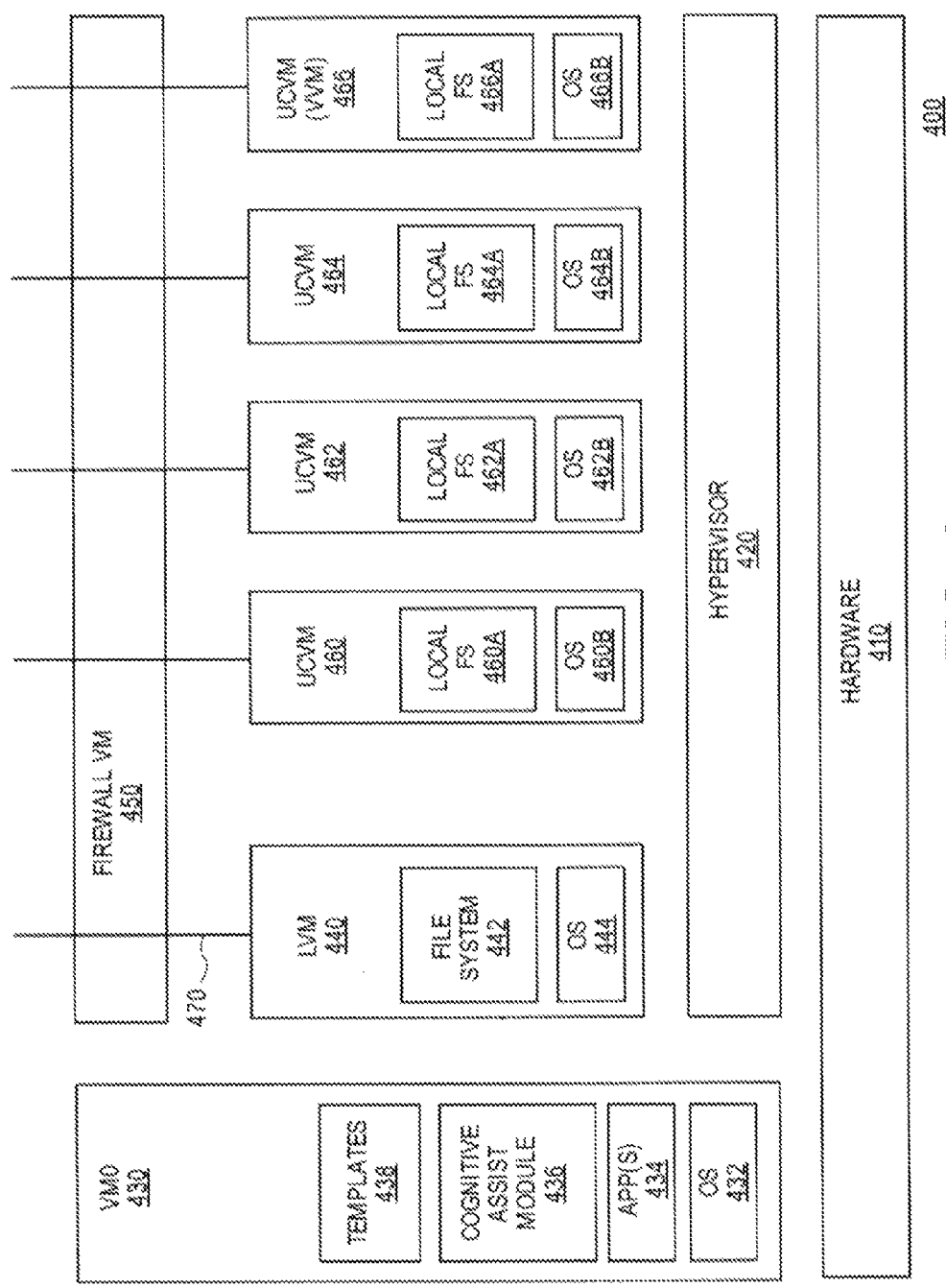
FIG. 4 is an block diagram of the functional components of one embodiment of the invention.

In an embodiment, system 200 of FIG. 2 may be implemented upon a client. A block diagram of a client 400 according to one embodiment of the invention is shown in FIG. 4. The term "client," as broadly used herein, represents any type of Internet endpoint or computer system capable of connecting to a network and executing a virtual machine. Non-limiting, illustrative examples of client 400 include a PC, a laptop computer, a tablet computer, a cell phone, a personal digital assistant (PDA), and the like.

In an embodiment, client 400 may correspond to a server. Thus, while use of the term "client" in other contexts might exclude an interpretation that includes a server, as broadly used herein, client 400 may be embodied on a wide variety of machines, one example of such being a server. Thus, as the Applicant may be his or her own lexicographer, as used herein, the term client 400 expressly includes a server. For example, non-limiting, illustrative examples of client 400 include a web server, an application server, a file server, and a cloud server. Indeed, implementing embodiments of the invention upon a server may yield many benefits. The micro-virtualization techniques employed by embodiments provide an efficient, scalable mechanism for (a) reducing the amount of physical memory required by a virtual machine and (b) eliminating the risk of executing untrusted code and/or interpreting untrusted data in accordance with different policies to manage such risk. As such, a device, such as a server, which interacts with (a) numerous sources of untrusted code and/or data and/or (b) two or more corporate entities having different policies towards managing the risk of untrusted code and/or data, may benefit from embodiments of the invention.

Client 400 includes a number of virtual machines (such as 430, 440, 450, and 460, for example) that execute on hardware 410 of client 400. The various VMs within client 400 may be used for separately executing processes associated with different activities. One such VM, namely "VM0" (i.e., VM0 430 of FIG. 4), is secured so that VM0 may serve as the root of trust with a guaranteed integrity. VM0 may contain core operating system 432 and one or more applications 434. In the embodiment shown in FIG. 4, VM0 is not accessible over any network, such as the Internet. As shall be explained below, VM0 provides a secure environment in which operating system 432 and one or more applications 434 may execute without risk of exposure to malicious code.

Other VMs, such as VMs 460, 462, 464, and 466 in FIG. 4, may be created, maintained, and destroyed on-demand using a very efficient micro-virtualizing hypervisor 420. Generally, there are two types of hypervisors. Type 1 (or native, bare metal) hypervisors run directly on the host's hardware to control the hardware and to manage guest operating systems. A guest operating system thus runs on another level above the hypervisor. Type 2 (or hosted) hypervisors run within a conventional operating system environment. With the hypervisor layer as a distinct second software level, guest operating systems run at the third level above the hardware. In other words, Type 1 hypervisor runs directly on the hardware; a Type 2 hypervisor runs on another operating system, such as Windows. Embodiments of the invention may use any type of hypervisor. Thus, hypervisor 420 in FIG. 4 may either be a Type 1 or a Type 2 hypervisor.

Using the efficient micro-virtualization techniques of embodiments, the latency of starting and stopping activities or applications which run in their own VM in embodiments is very low, thereby providing a practical user experience while employing full OS virtualization. Embodiments address and overcome many disadvantages, such as the Lack of Isolation Problem, experienced by modern general purpose computer systems that execute code from different sources and of differing trust levels; nevertheless, embodiments maintain compatibility with current typical real-world usage of computer systems by corporate and non-corporate users. This is so because any activity which is not previously deemed trustworthy is performed in a separate VM by certain embodiments, and so all code which may be potentially malicious is executed in its own VM that is destroyed after its immediate use is ended, thereby preventing any malicious code from effecting any lasting change to a computer system according to an embodiment of the invention.

The Trusted Virtual Machine—VM0

In an embodiment of the invention, a special virtual machine, referred to herein as "VM0," is created to be a trusted and secure portion of a computer system. FIG. 4 depicts VM0 430 according to an embodiment. To achieve the property of being trusted and secure, VM0 430 may be permanently disconnected from any network (i.e., VM0 430 is not connected to any local network or the Internet). Specifically, VM0 430 may not contain any type of networking stack, such as a TCP/IP network stack, and may not have access to any networking hardware that could allow for communication between VM0 430 or any applications 434 executed thereby and the Internet. Thus, to install software onto VM0 430, it is typically required to have physical custody of client 400 and manually install the software onto VM0 430. Note that a client may contain any number of VM0 virtual machines. While FIG. 4 depicts an embodiment comprising a single VM0, other embodiments may comprise two or more VM0s.

Thus, in certain embodiments, one or more applications 434 executing within VM0 430 do not have any access to a network, must be fully self contained in their functionality, and must rely only on local code and data for all their functionality. All applications that need to access the network will therefore need to run in a separate virtual machine outside of VM0 430, as shall be described in further detail below. It is envisioned that the software (such as one or more applications 434) running in VM0 be selected at the time client 400 is manufactured or first configured for use in a controlled environment. Because VM0 430 is never connected to any type of network, such as a TCP/IP network, all common types of network initiated attacks cannot be waged against VM0 430, thereby rendering VM0 430 immune to such attacks and safe as compared to any computer or VM that is connected to the Internet.

In an embodiment where hypervisor 420 is a Type 2 hypervisor, when client 400 is booted, only VM0 430 is started by the BIOS or firmware of client 400. Once VM0 430 is running, VM0 430 can start hypervisor 220 immediately or on demand. In another embodiment, where hypervisor 420 is a type 1 hypervisor, hypervisor 420 is first started by the BIOS when client 400 is booted and VM0 430 is launched by the hypervisor 420. Hypervisor 420 is a software component that is responsible for creating other VMs which each execute independent instances of the operating system. These additional VMs are instantiated by VM0 430 and/or hypervisor 420 to run any untrusted code or code that needs to access the network. Untrusted code in this context is any code which has not been pre-approved as being trusted by an IT administrator of client 400. The additional VMs are started "silently" and automatically by client 400, e.g., these VMs are started transparently to the user and without the user having to do anything explicit. These additional VMs are also not explicitly visible to the user; instead, all the user sees on the desktop is familiar objects (such as icons, windows, and applications) without any indication that multiple VMs are executing in client 400. Embodiments of the invention follow rules that govern what application activities are assigned to which particular VM. These rules are described below in greater detail.

In another embodiment (not depicted in FIG. 4), VM0 430 may have a networking stack that is firewalled off from the network using well-tested firewall software, thereby allowing VM0 430 to have access to a computer network. Such an embodiment may only allow connections with a specific Internet system so that the software inside VM0 430 may be updated from a designated update server. For example, the firewall software may only allow VM0 430 to connect to one or more servers associated with the IT administrator of client 400 and may prevent VM0 430 from establishing a connection with any other endpoint on any network.

Interaction with a User Interface

All code responsible for generating a user interface (UI) not associated with an application may be maintained in VM0 430. Consequently, all UI interaction activity with the desktop between a user and software executing on client 400 may take place between the user and VM0 430, which maintains a unified desktop for all applications running in all VMs. Interaction between the user and applications running in VMs other than VM0 430 takes place indirectly via VM0 430. For example, when the user enters a password for a web site whose browser and HTML/JavaScript code is running in an untrusted VM, the password is first directly provided to VM0, which then transfers the information to the untrusted VM. Furthermore, the untrusted VM's display is rendered on to a virtualized display, which is then composed into the VM0 desktop (as appropriate) by controlling code running in VM0 430. As code executing in VM0 430 is trusted, the user may trust any user interface controls displayed on a screen since all code responsible for rendering the user interface is trusted.

This approach is quite different from prior systems where often the code that controls the full desktop experience is untrusted. Consequently, if the code responsible for generating the user interface is corrupted by malware, then the user interface may be used as a tool to deceive the user. For example, malware may cause a user interface control to be displayed that requests the user to submit an authentication credential which will be used for improper purposes by the malware. However, this problem is overcome by embodiments of the invention—since all code responsible for rendering user interface controls executes in a secure location, such as the host or VM0, malware is prevented from hijacking or corrupting code responsible for rendering a user interface.

Figure 9:
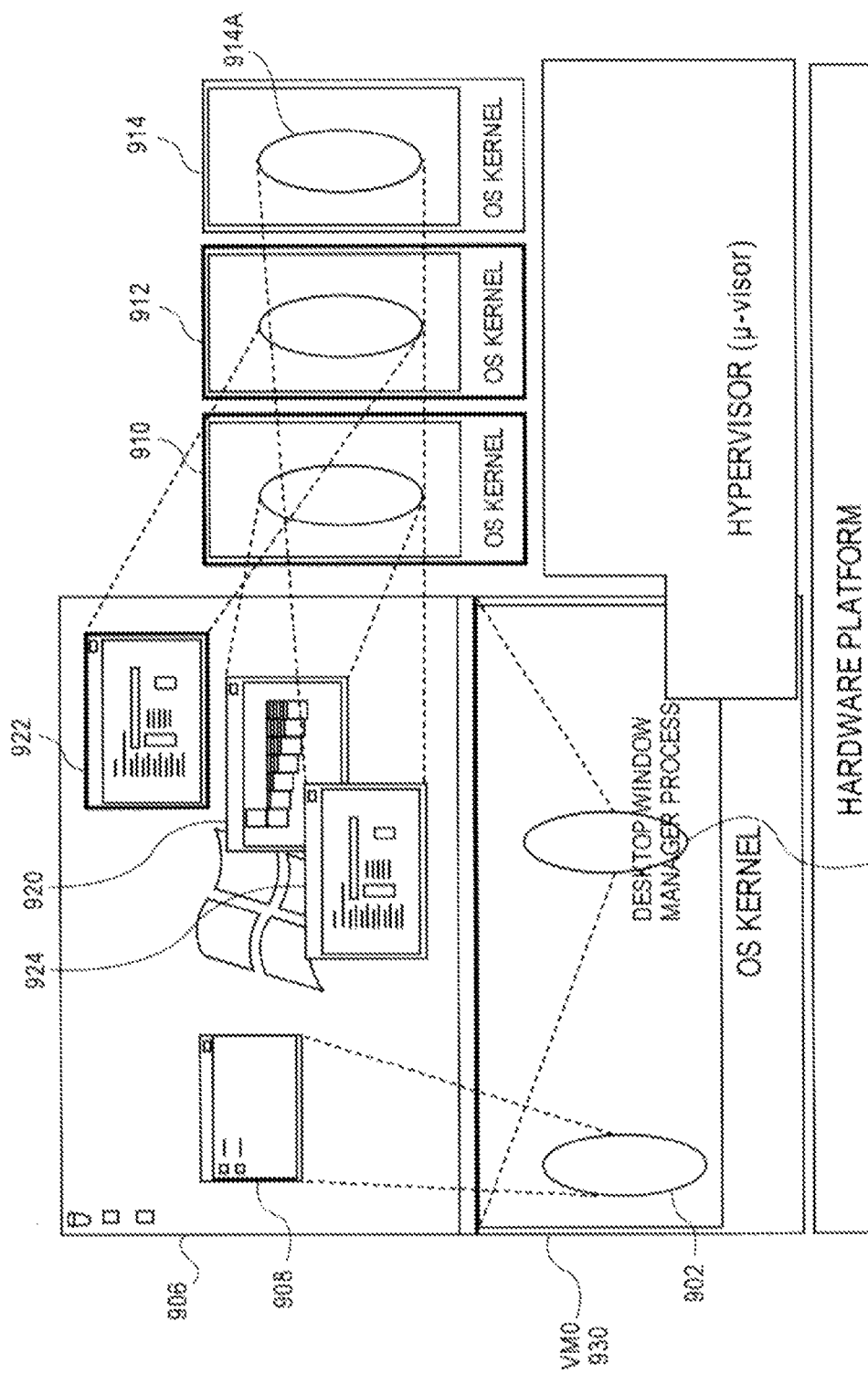
FIG. 9 is an illustration of exemplary desktop of a client according to an embodiment of the invention.

To illustrate an embodiment of the invention, consider FIG. 9, which is an illustration of exemplary desktop of client 400 according to an embodiment. As shown in FIG. 9, process 904 is responsible for rendering desktop 906 on a physical display of client 400. Process 914A runs in untrusted VM 914 and does not have complete access to the file system of client 400. When any process inside VM 914 requests access to the file system of client 400, it is intercepted and process 902 is responsible for rendering a window 908 depicting the contents of the file system of client 400. Process 902 has the option of selectively displaying which contents are available to the VM 914 based on policies as set forth by the IT administrator or the user. VM 910 in FIG. 9 that runs the solitaire game is implemented such that the display of VM 910 is a virtualized display, which is then composed into the desktop 906 (as appropriate) by controlling process 904 running in VM0 430. The displays of VMs 912 and 914 are rendered on the desktop 906 in a similar fashion.

Note that in certain embodiment code that is responsible for rendering a user interface may execute in both the host and one or more virtual machines, such as VM0. In such a case, the UI-rendering code executing in the host will assemble all the off-screen buffers of the UI-rendering code executing in the virtual machines to present a single on-screen image. As a result, the UI-rendering code executing in the host may render certain content portions differently based on whether they are trusted or not. For example, a window frame may be displayed having a particular color by the UI-rendering code executing on the host to signify that the content displayed therein originated from an untrusted source. Any type of visual identifier, such as a color, font, graphic, or banner may be used to signify that content originated from an untrusted source.

The Legacy Virtual Machine—LVM

FIG. 4 depicts a legacy virtual machine (LVM) 440 according to an embodiment of the invention. LVM 440 may contain operating system 444. LVM 440 serves as the primary entity being managed by the IT administrator of client 400. As such, LVM 440 provides an environment that is analogous to the managed enterprise OS of corporate computer system in that an IT department may install and maintain various enterprise applications within operating system 444 of LVM 440. In an embodiment, operating system 444 of LVM 440 may correspond to a Microsoft Windows OS or any other general purpose OS such as Linux or MacOS.

In an embodiment, LVM 440 is responsible for storing the main file system 442 of client 400. File system 442 may contain the user's profile folder containing the user's settings and files.

LVM 440 typically only runs infrastructure OS programs and programs that are used for the purpose of managing client 400 and trusted enterprise applications. Other user programs (especially those that involve external components or consume untrusted data) do not run in LVM 440, but instead, run elsewhere in separate VMs (such as a UCVM as described in more detail below).

In an embodiment, the network access of LVM 440 is restricted to just the corporate network as implemented by firewall VM 450. Firewall VM 450 is a specialized virtual machine that comprises firewall software/applications to restrict network access of VMs running in client 400 to appropriate and/or necessary network access points. Such practice is consistent with the need for only the responsible IT administrator to be capable of connecting to LVM 440 to manage LVM 440 and processes executing therein.

In one embodiment, LVM 440 and VM0 430 may be implemented in a single virtual machine.

Untrusted Code Virtual Machine—UCVM

When a user wishes to run any application that requires access to either a network or untrusted data (untrusted data is any data that originates from outside client 400), the application is run inside a dedicated VM that is created on-demand by hypervisor 420. This dedicated VM is called an Untrusted Code Virtual Machine (or UCVM). FIG. 4 depicts several UCVMs, namely UCVM 460, 462, 464, and 466. A UCVM operates under the assumption that, in general, any code that connects to the network and interacts with arbitrary code executing on an external device may at some point be compromised. This assumption also applies to trusted applications that interact with data originating from outside the computer system executing the trusted application, because such data may, at some point, contain embedded malicious code. To address such possibilities, such applications are executed in a UCVM to prevent any malicious code, inadvertently introduced into the UCVM, from having the capacity to affect any change outside of the UCVM.

In an embodiment, a UCVM is created by (a) cloning a copy of LVM 440, or a stripped-down version of LVM 440, in memory and (b) providing access to a restricted file system to the newly created UCVM. For example, UCVM 460 comprises restricted file system 460A, UCVM 462 comprises restricted file system 462A, and UCVM 464 comprises restricted file system 464A. Each UCVM possesses its own instance or copy of the operating system, which is isolated and separate from the main operating system (including its code and data) executing within VM0 430 or LVM 440. For example, UCVM 460 comprises operating system 460B, UCVM 462 comprises operating system 462B, and UCVM 464 comprises operating system 464B.

To provide a low latency user experience, UCVMs may not be booted from scratch each time an application is needed to be started. Instead, a UCVM may be created very quickly by cloning the UCVM from a template VM (with a booted OS) that has been pre-loaded in memory at system boot time. In an embodiment, the template used to clone a UCVM may be selected from templates 438 stored in VM0 430. A variety of techniques can be employed to make this cloning operation as fast as a few 100 milliseconds. Multiple types of templates may be used by a system to create UCVMs depending the nature and type of application(s) to be run inside the UCVM, as discussed in greater detail below in the section entitled "Cloning a UCVM from a Template."

Cognitive assist module 436 is software that is responsible for implementing the rules and policies of embodiments as well as helping the user of client 400 in understanding and navigating the security model employed by client 400 on an as-needed basis. Cognitive assist module 236 helps decide what activities run in which UCVMs, including when VMs are created or destroyed, and what kind of access to network and file system resources each UCVM has. Cognitive assist module 436 also helps protect the user, e.g., when a user is fooled by malware running in a UCVM and is in the process of providing some information that they have previously provided to enterprise code running in LVM 240 (for example a password), then cognitive assist module 436 may detect this situation and prevent the user from providing the information (which may be secret corporate information) to the malware.

In an embodiment, router module 230A of FIG. 2 may correspond to cognitive assist module 436 of FIG. 4. Thus, while FIG. 2 and the description thereof provides a description of how embodiments operate from a certain perspective, those skilled in the art shall appreciate that the actions and responsibilities attributed to router module 430A may also be performed and assumed, in certain embodiments, by cognitive assist module 436 of FIG. 4.

Regarding the restricted file system of each UCVM, each UCVM has access to a private copy of a subset of the files in file system 442 on client 400. A UCVM may only have access to those files which the UCVM should need for the correct operation of the application executing therein. For example, user files are usually not required for correct operation of an application executing in a UCVM and thus are not typically exposed to a UCVM. On the other hand, if a UCVM is created as a result of the user wishing to edit a document using an application, such as MS Word, then a copy of the document the user wishes to edit will be provided to the restricted file system of the UCVM at the time the UCVM is created. Advantageously, using UCVM 460 as an example, if a process executing within UCVM 460 makes any changes to any files in restricted file system 460A, then these changes do not impact the files stored in file system 442 maintained in LVM 440 because such changes are only made to restricted file system 460A maintained in the UCVM and are not propagated, without express consent from the user, to file system 442 maintained by LVM 440.

In a typical use case of a UCVM, the UCVM may run a local application or an individual web page session. When a user is done running the local application or navigates away from a web page to another page with a different Internet URL domain, the corresponding UCVM is destroyed. Any new local application or web application will be run inside a brand new, separate UCVM that is cloned again from a clean UCVM master template. Thus, if there has been any compromise to the UCVM during the course of running some malicious code that was introduced into the UCVM, then the adverse affects of the security breach are isolated to only the affected UCVM and are lost when the UCVM is destroyed.

For example, assume that a user double-clicks on a MS Word document icon in Windows Explorer. Embodiments create a special UCVM to run the MS Word process. In a particular embodiment, cognitive assist module 436 of VM0 430 may dynamically create the UCVM using a template in one or more templates 438 or use a pre-existing template in memory or on the disk. The template selected by cognitive assist module 436 may be selected based on what activity is to occur within the UCVM, i.e., the selected may be designed to create a UCVM having characteristics that are optimal for running a text editor therein. The created UCVM contains a copy of the operating system as well as a restricted (local) copy of the file system. This local copy of the file system in the UCVM contains all the usual Windows and Program files; however, the user's profile folder in the local copy of the file system contains only the single target MS Word document being opened.

As another example, assume that three tabs are open in a web browser and further assume that each tab is open at a different web page. In consideration of the code which may be contained or embedded on a web page, each web page may be properly considered a web application. In embodiments of the invention, the code responsible for rendering the user interface (UI) of the web browser runs in VM0 430. On the other hand, executable code for the three web applications runs in three separate UCVMs. A core HTML/JavaScript engine runs in each of the three UCVMs. A copy of the file system within each of the three separate UCVMs does not contain any part of the user's files, as they are not required for the task performed by each UCVM, namely displaying a web page. Thus, each web application (or web page in this example) is completely isolated from the rest of the system.

In an embodiment, a UCVM may be connected to the Internet according to an access policy determined by the nature of the code running within the UCVM. To illustrate, web pages are typically restricted as per a strict "same origin policy" similar to the rules implemented by modern web browsers. In the "same origin policy," scripts running on web pages are permitted to access methods and properties of other scripts originating from the same site with no specific restrictions, but are prevented from accessing most methods and properties across web pages on different sites. Untrusted native applications running outside of the web browser are restricted by default to be able to connect only to the domain from which the program was downloaded (and to specific content delivery networks (CDNs) that may be in use by the domain in question).

This level of network access for downloaded applications can be explicitly changed (increased or decreased) by the end-user to include additional sites on the Internet. End-user control over what a UCVM can connect to may be subject to certain limitations related to corporate networks and sensitive web sites (such as a bank and web mail provider). For example, any code running in a UCVM may not, in general, access any site on a corporate Intranet to which client 400 is connected. Applications that need to connect to the corporate Intranet may need to be signed by the IT administrator of the domain. Similarly, non-web untrusted application code in a general UCVM may not connect to a web site associated with a search engine or bank or other sites that may have been previously identified as being "off limits." These connections can only be made through a web browser (which spawns UCVMs bound to these special domains) or from a special purpose LVM called a VVM, which described in further detail below.

In an embodiment, there is no communication channel available for an application running in one UCVM to communicate with an application running in another UCVM. Thus, applications running in UCVMs are completely isolated from each other and from the other applications in the system. This is well suited for running downloaded third party local applications which are generally designed to be self-contained or for Internet applications (web pages are not supposed to rely on any communication between applications within the web browser). In an alternate embodiment, communication between an identified set of virtual machines can be enabled by a person with sufficient privileges, such as an IT administrator for client 400.

Firewall Virtual Machine

In an embodiment, the implementation of the network access restrictions is done in a dedicated VM called a firewall VM. FIG. 4 depicts an exemplary firewall VM 450 of an embodiment. Firewall VM 450 runs an isolated operating system with a dedicated and fixed set of firewall applications that implement the network access policy for all VMs in client 400 (except perhaps VM0, which may not have any network access). Firewall VM 450 may provide, to any virtual machine running on client 400 in which untrusted code is executed or untrusted data is being interpreted, restricted access to only those network resources deemed necessary on an as-needed basis in accordance with a policy described by policy data stored on client 400.

In another embodiment of the invention, the firewall functionality of the system may be co-located and implemented inside either the hypervisor 420 of FIG. 4, or inside the LVM 440 of FIG. 4 (working in conjunction with the hypervisor 420 of FIG. 4), or inside VM0 430 of FIG. 4 (working in conjunction with the hypervisor 420 of FIG. 4).

Validated Virtual Machines—VVMS

UCVMs are not appropriate to run local applications that interact heavily with each other using local APIs such as COM, as typically there is no communication channel available for an application running in one UCVM to communicate with an application running in another UCVM. Embodiments may employ one (or more) special UCVMs called a Validated Virtual Machine (VVM) for the purpose of running relatively trusted local applications that have complex interactions between the applications. Such complex interactions are common in enterprise frameworks containing multiple applications, such as Microsoft's Office Suite and IBM's Lotus Notes.

FIG. 4 depicts an exemplary VVM 466 of an embodiment. Note that while FIG. 4 depicts a single VVM for ease of explanation, other embodiments of the invention may employ two or more VVMs or no VVMs based upon the particular needs of the user and/or policies of the organization responsible for or the owner of client 400.

Applications need to be signed and configured for co-location in the same VM by an administrator of client 400 before they can run in VVM 466. Inside VVM 466, signed applications can interact with each other using all types of APIs and frameworks supported by the OS being used. In an embodiment, the default network access policy of a VVM is to allow access to a corporate network only. The IT administrator may increase or decrease this level of access, subject to certain restrictions.

In an embodiment, specific signed applications or suites (groups of applications) that originate from a trusted source (other than the enterprise) may also be designated to run together in a particular VVM responsible for applications originating from that source. For example, all non-corporate applications that are signed by a specific vendor may be run together in a single VVM. These applications would then be isolated from corporate applications and general untrusted applications, but not from one another. A specific network access rule that is more permissive than the "same origin policy" used for web applications and unsigned applications may be used for a VVM. The restricted copy of file system 442 exposed to a VVM is similar to that exposed to a generic UCVM in that the restricted copy of file system 442 exposed to a VVM comprises only those files related to, or required for, performance of the applications executing within the VVM.

The Restricted File System Exposed to a VM

Figure 5:
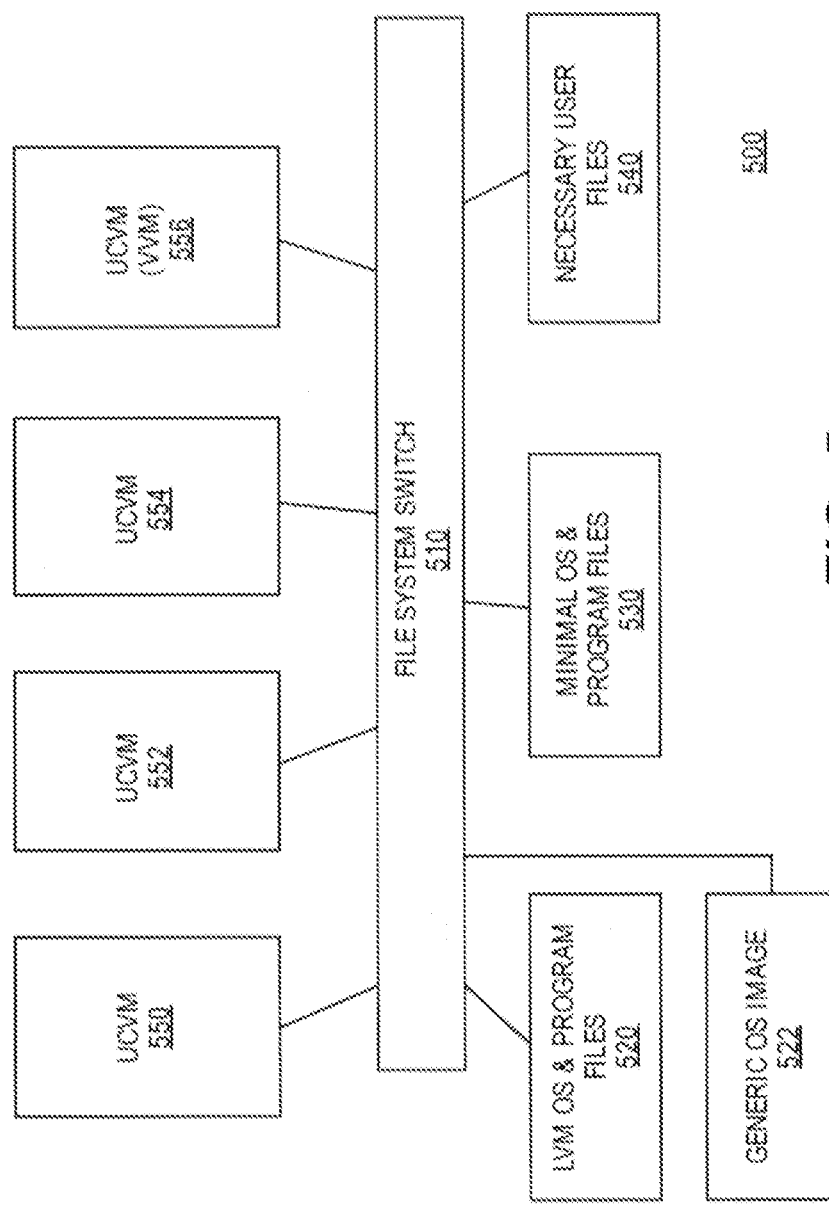
FIG. 5 is block diagram of the functional components involved in exposing a restricted copy of the file system to different UCVMs (and VVMs) according to an embodiment of the invention.

FIG. 5 is block diagram of the functional components involved in exposing a restricted copy of file system 442 to different UCVMs (and VVMs) according to an embodiment of the invention. File System Switch 510 is software that is configured to provide the newly created UCVM with access to a copy-on-write clone of the OS image that the UCVM was created from once the UCVM has started. The minimal operating system and program files 530 in the copy-on-write clone may be created from either the corporate LVM OS image 520 or a separate generic, stripped down OS image 522 which may be created by the IT administrator.

Furthermore, a newly created UCVM is provided a copy of necessary user files 540, which are a subset of the user files in file system 442. The composition of necessary user files 540 will be different for each user. The set of files comprising the user files in file system 442 maintained in LVM 440 are typically those files in the user's home folder, e.g., c:\Users\<username>. The particular copies of files that are provided to a particular UCVM as necessary user files 540 are the minimum set of files that are needed by that UCVM to accomplish what the user intended to do as captured when the target application was being invoked. For example, if the user double clicked on a specific MS Word file named ABC.docx at the location c:\Users\<username>\Documents in the file system 440 maintained in LVM 440, then necessary user files 540 would only include a copy-on-write clone of the ABC.docx file and only this copy-on-write clone of the ABC.docx file is made available in the virtual c:\Users\<username>\Documents folder made visible to the newly created UCVM running the MS Word application. If a program (like MS Word) was started without any association with a file, then necessary user files 540 would correspond to an empty c:\Users\<username>\Documents virtual folder.

Any application running in a UCVM therefore only has access to the particular set of user files provided explicitly by the user when the program was invoked. Subsequently, if the user wants to browse file system 442 for another file from within the application (for example, by using the File->Open menu item of MS Word), then he or she will see a restricted user files directory.

Figure 6:
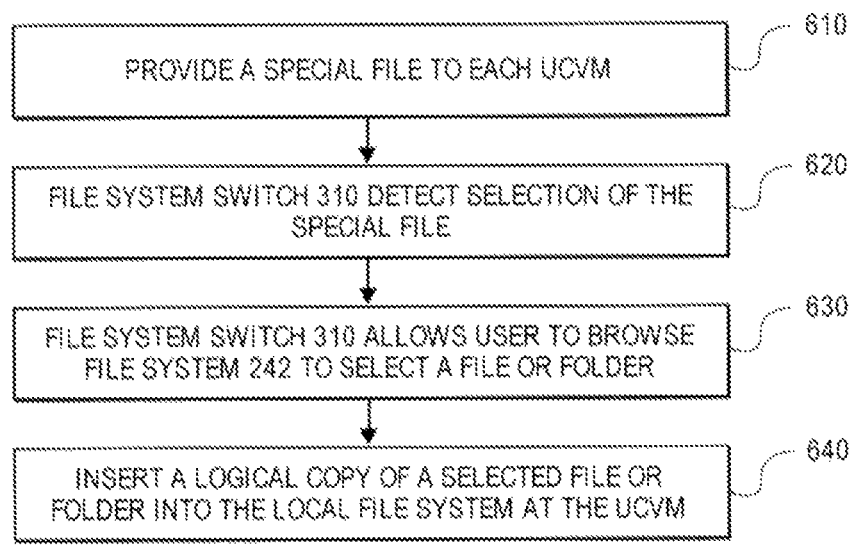
FIG. 6 is a flowchart illustrating the steps involved in a UCVM obtaining a copy of a new user file maintained in the file system stored elsewhere according to an embodiment of the invention.

To enable the user to select files from the user's own User Files folder in file system 442 maintained in LVM 440 using an application executing within an UCVM, a user interface may be provided to allow the user to browse his or her files in file system 442, select one or more of the user files, and expose a copy of the selected files to the appropriate UCVM. For example, FIG. 6 is a flowchart illustrating the steps involved in a UCVM obtaining a copy of a new user file maintained in file system 442 according to an embodiment of the invention. In step 610, a special file is provided to each UCVM. The special file may be provided to the UCVM in a number of different ways, e.g., the special file may be inserted into each folder of the virtual C:\Users\<username>directory provided to each UCVM. This special file may be named something akin to "Show All My Files" or the like, as its selection will be used to trigger exposing additional copy-on-write clones of files stored in file system 442 to the UCVM.

In step 620, File System Switch 510 detects when the special file is selected by the user. For example, when a program executing within a UCVM browses to the special file, presumably as a result of a user click, this action may be trapped by File System Switch 510.

In step 630, File System Switch 510 invokes a dialog with LVM 440 that allows the user to browse the full file system 442 maintained in LVM 440. The user may then select one or more files or folders in file system 442. Note that at this stage, the user may be granted read access to the full file system 442 for purposes of selecting a file or folder, but the user is not granted write access to file system 442. Therefore, the user is prevented from modifying file system 442 maintained by LVM 440 in any way.

In step 640, after the user selects a file or folder, a copy of the selected file or folder is created. The copy of the selected file or folder is then inserted into the restricted file system associated with the UCVM. As a result of inserting the copy of the selected file or folder in the restricted file system associated with the UCVM, an application executing in the UCVM may have read and write access to the copy of the selected file or folder in the virtual file system, but is prevented from effecting any change to the original copy of the selected file or folder in file system 442 maintained by LVM 440. If multiple files or folders are selected in step 630, then in step 640 a copy of each selected file or folder is created and inserted in the restricted file system associated with the UCVM.

The steps of FIG. 6 ensure that files in file system 442 maintained by LVM 440 are not visible to a UCVM without explicit permission from the user. Malicious code running in a UCVM, for example, cannot programmatically access files in file system 442 in LVM 440. Further, malicious code running in a UCVM also cannot render a false user interface to trick the user into unintentionally providing any user files to the malicious code, since all code responsible for rendering the user interface is maintained within VM0 430, and thus, unreachable by the malicious code.

File System Switch 510 may be implemented in a variety of ways. For example, in one embodiment, File System Switch 510 may be implemented by a network file system protocol (NFS or CIFS may be used). A special VM (or LVM 440) may be used as the OS serving the "User Files" shared file system. Other VMs "mount" this shared file system using NFS or CIFS (or another network file system) from the hosting VM. Application software in the hosting VM may decide what files are exposed to which VM based on instructions provided by VM0 430.

In another embodiment, File System Switch 510 may be implemented, in part, by a proprietary protocol for handling communications between the different UCVMs and File System Switch 510. File System Switch 510, in such an embodiment, may be implemented as part of a special VM or in LVM 440.

Cloning a UCVM from a Template

In an embodiment of the invention, every virtual machine created in client 420 is instantiated using a template selected from one or more templates 438 stored in VM0 430. In an embodiment, a template may be either immutable or may be updated in a very controlled fashion.

Each of one or more templates 438 may be used to instantiate or create a virtual machine with different characteristics or operational parameters. The characteristics or operational parameters described by a template may be configured, tailored, or suited for a particular context or type of processing activity. For example, each template may specify what type of code is to be run within a virtual machine created using the template, a size of the virtual machine created using the template, firewall settings for the virtual machine created using the template, what type of virtual machine (for example, a VVM, UCVM, or a LVM) is the be created using the template, how changes to a local file system within the virtual machine created using the template are to be persisted, and what portion, if any, of the network can a virtual machine created using the template access.

One or more devices internal to client 400 or externally connected to client 400 may interact with one or more processes executing in a virtual machine within client 400. In an embodiment, a template may assign responsibility for a selected set of devices to a virtual machine created using the template. In other embodiments, responsibility for a selected set of devices may be assigned to a particular virtual machine by virtue of policy data stored on client 400. Such policy data may describe one or more policies provided to client 400 from an owner or responsible organization of client 400. Policy data of this nature may be maintained by VM0 430 or LVM 440, for example, in certain embodiments.

In an embodiment, one or more templates 438 may be arranged in a hierarchy such that there is a root node corresponding to a template having a default set of characteristics. The root node may have one or more child nodes, and each of these child nodes may be associated with a template that inherits the properties of the parent template, but contains additional or changes properties associated with that child node. Naturally, each child node may also have children, and so the hierarchy of templates may be an arbitrary number of levels deep, where each template inheriting characteristics of its parent, but yet each template is capable of further defining or changing characteristics that distinguishes the template over its parent.

Branches of the hierarchy of templates may be associated with, or more particularly suited, different types of activity. For example, certain templates may be associated with corporate activity, and may therefore specify characteristics related to virtual machines running corporate applications. Similarly, certain templates may be associated with the user's personal application's activity or Internet/Web related activity, and may therefore specify characteristics related to virtual machines running the user's own applications or Internet/Web applications respectively.

Figure 7:
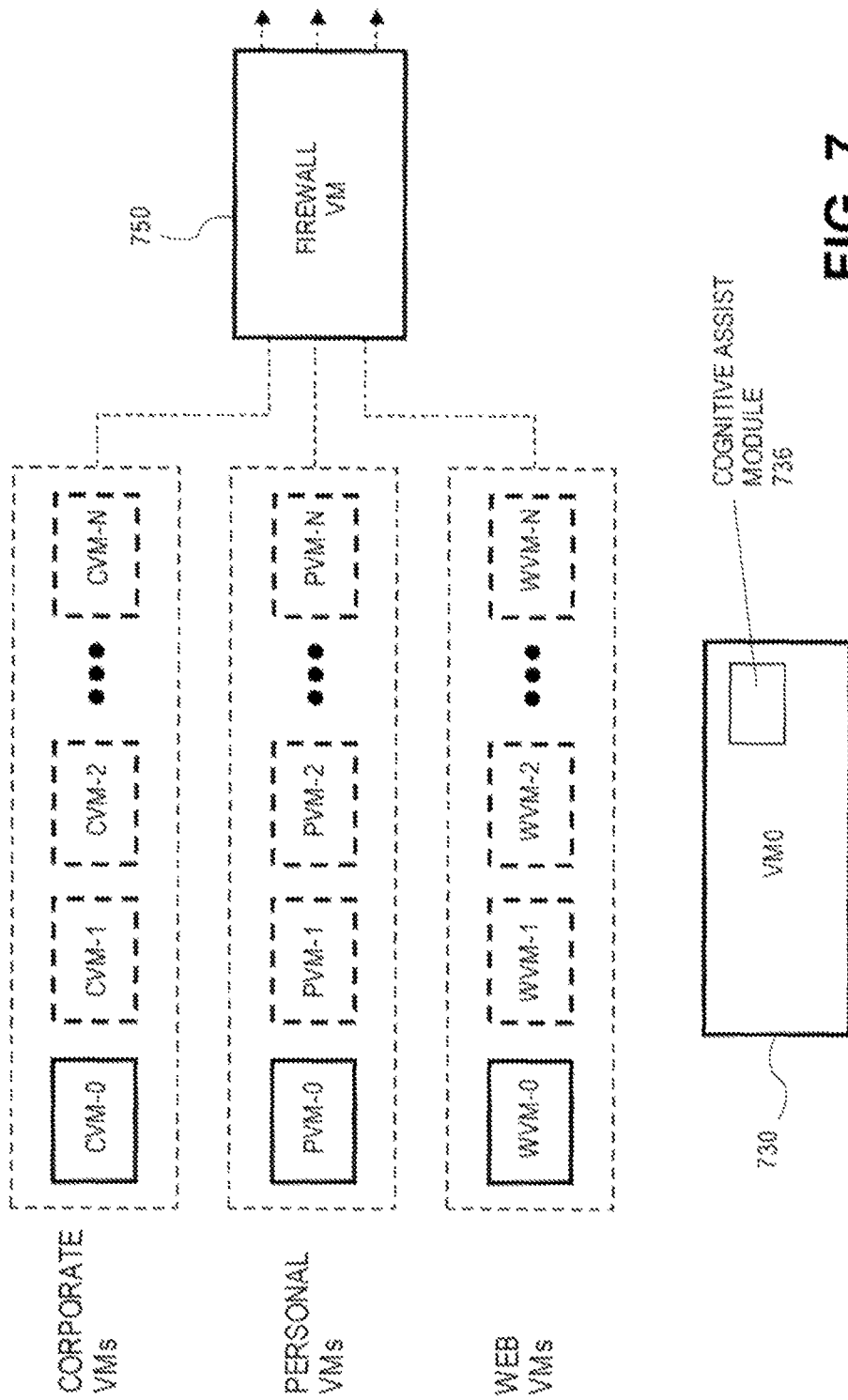
FIG. 7 is an illustration of instantiating a plurality of different virtual machines using different templates according to an embodiment of the invention.

FIG. 7 is an illustration of instantiating a plurality of different virtual machines using different templates according to an embodiment of the invention. In FIG. 7, CVM-0 represents a template that defines a virtual machine having characteristics suitable for running a corporate application, PVM-0 represents a template that defines a virtual machine having characteristics suitable for running a user application (non-corporate), and WVM-0 represents a template that defines a virtual machine having characteristics suitable for running an Internet application. Other embodiments of the invention may define a variety of other templates to define different types of templates. In the example of FIG. 7, cognitive assist module 436 in VM0 230 may use CVM-0 to instantiate one or more corporate virtual machines, such as CVM-1, CVM-2, etc. Similarly, cognitive assist module 436 may use PVM-0 to instantiate one or more personal (non-corporate) virtual machines, such as PVM-1, PVM-2, etc., and cognitive assist module 436 may use WVM-0 to instantiate one or more web-based virtual machines, such as WVM-1, WVM-2, etc. As depicted in FIG. 7, each instantiated UCVM connects to an external network through firewall VM 250. Cognitive assist module 436 can either create these templates on demand or create and store them while monitoring the usage of the client.

Installation of Software

After-market software is typically installed on a computer system. Such after-market software generally falls into one of two categories, namely (a) validated software (packages or straight executables) installed by the IT administrator or (b) end-user installed software (including web browser plug-ins & extensions).

In embodiments of the invention, installation of validated software is performed as is normally performed today. The IT administrator can manage corporate validated software using embodiments using similar procedures as performed today, except that such corporate validated software are installed in LVM 440 (or if need be, VVM 466).

With respect to end-user installed software, IT administrators have two choices for how they would like to handle this type of installation using embodiments of the invention. The first choice is for the IT administrator to lock down client 400 by disallowing any installation of end-user installed software. While this is a safer operating decision, this approach may reduce the end-user's productivity because the end user cannot take advantage of applications that may be otherwise useful that have not yet been validated by the IT administrator. The IT administrator may provide installation support on an individual and as-needed basis whenever a user wishes to install any end-user installed software; however, doing so will increase the cost of support by the IT administrator.

The second choice is for the IT administrator to allow the user to install end-user installed software him or herself using features provided by embodiments of the invention. End-user installed software may include browser plug-ins, browser extensions, signed and unsigned installation packages, and straight executables. Browser plug-ins may be installed into an installed browser plug-in database that is maintained in a particular UCVM. The installed browser plug-in database may be implemented, in an embodiment, using file and registry diff store 1020 shown in FIG. 10, which is an illustration of safely installing an untrusted application according to an embodiment of the invention of the invention. During installation of a plug-in, the installed browser plug-in database is also updated to record the domain that was used to initiate the plug-in install. Presumably, this is the web page that contains an element or component that requires the plug-in to render the complete content in the web page. Subsequently, the web browser loads an installed plug-in into a web HTML/JS engine instance (which runs inside a UCVM) only if the domain of the web page to be displayed by the UCVM matches a domain, recorded in the plug-in database, associated with the installed plug-in. A plug-in that is used by multiple sites is installed only once, but is associated with multiple domains. Popular plug-ins like Flash may be pre-installed in certain embodiments.

Browser extensions may be installed into a web browser's extension database that is maintained in a particular UCVM. During runtime, browser extensions are treated like web applications in that each browser extension is run inside its own UCVM. In an embodiment, the web browser extension database and the installed browser plug-in database may be implemented in the same database in a single UCVM.

Signed installation packages may be run and the resulting installation may update either the LVM image or the Generic Windows image based on a policy set by the IT administrator.

Figure 10:
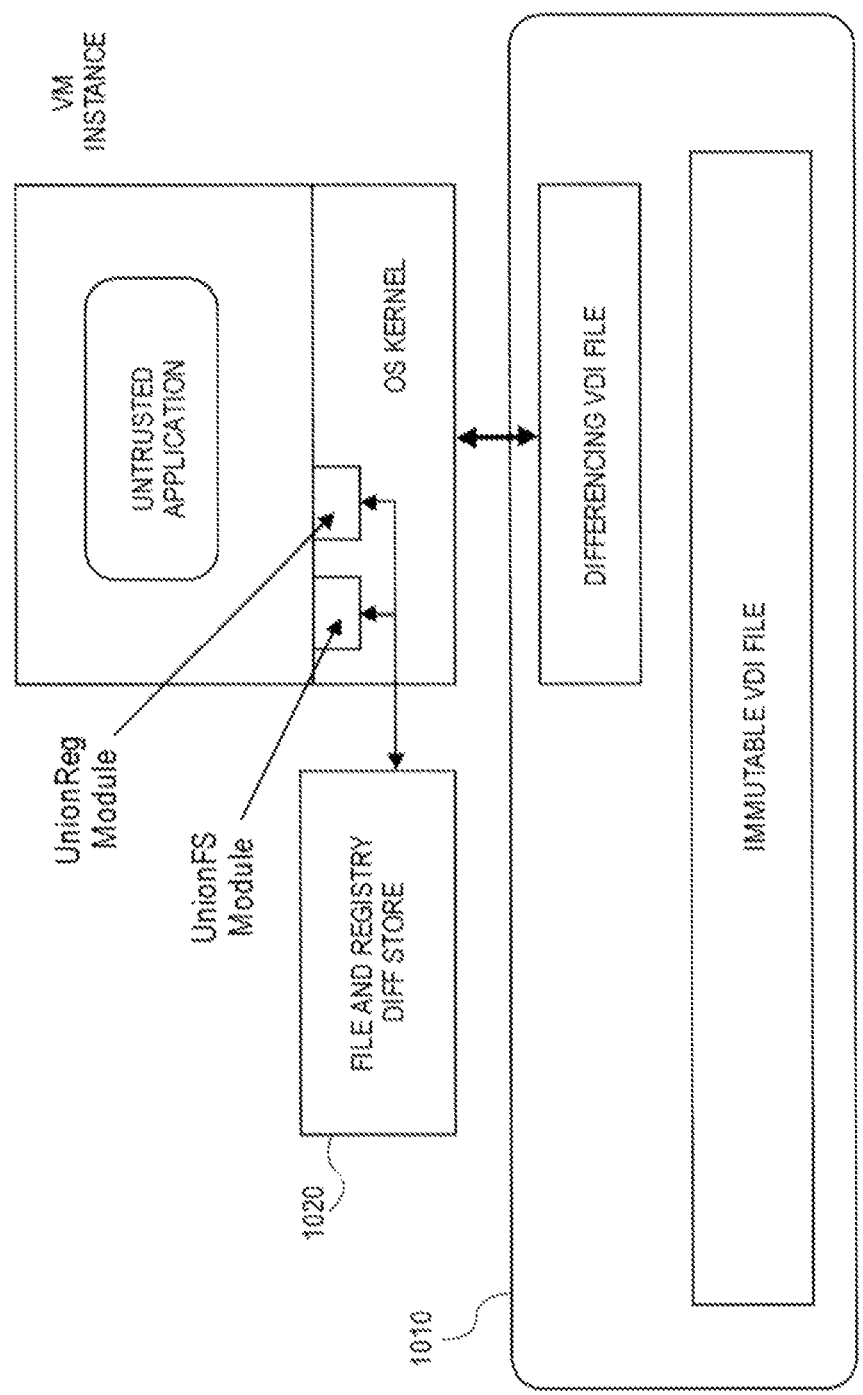
FIG. 10 is an illustration of safely installing an untrusted application according to an embodiment of the invention of the invention.

Unsigned installation packages go through a virtual install. The virtual installation of unsigned installation packages will be described with reference to FIG. 10, which is an illustration of safely installing an untrusted application according to an embodiment of the invention of the invention. A registry and program files change set is created and stored in file and registry diff store 1020. Start-menu and desktop changes by the installer are captured in a special folder which contains desktop and start menu items for all user-installed applications. Subsequently, if an unsigned application is run, it is run in a UCVM cloned from the Generic Windows image all by itself. Virtual disk 1010 in FIG. 10 is the normal virtual disk of the UCVM. DiffStore 1020, which further virtualizes the file system and the registry as seen by the applications of UCVM, is typically implemented as a separate module outside of the normal block level virtual disk store.

Signed and unsigned executables may be run in a UCVM. Such a UCVM may be created on demand and destroyed after its use is ended by embodiments.

Managing Web Cookies and Caches

A web cookie (or simply "cookie") is a piece of text stored on a user's computer by their web browser. A cookie can be used for authentication, storing web site preferences, shopping cart contents, the identifier for a server-based session, or anything else that can be accomplished through storing text data.

While the actual cookie itself is not visible to the user, the user would notice a difference in the user experience of interacting with a web site if cookies could not be saved between visits to the web site. Accordingly, embodiments of the invention provide mechanism to store cookies before a UCVM is destroyed, so that the next time the user visits the web site using a web browser running in a different UCVM, any cookies that have been stored and are associated with that web site may be injected into the new UCVM.

Similarly, to provide the best user experience, it would be advantageous to carry over the cache of a web browser for a particular web domain from one UCVM to the next, so that the next time the user visits the web domain using a different UCVM, there is no a delay in displaying content due to an unpopulated cache. Thus, embodiments of the invention provide mechanism to store the web cache of a web browser for a web domain before a UCVM is destroyed, so that the next time the user visits the web site using a web browser running in a different UCVM, the cache of the web browser need not be warmed (i.e., repopulated), as the cache in the new UCVM has been updated to contain all the objects the cache previously contained in the prior, and now destroyed, UCVM used to visit the web domain.

To provide a concrete example with reference to the example of FIG. 4, assume that a user initially transparently uses UCVM 460 to run a web browser to visit web site A. When UCVM 460 is destroyed, any cookies and cache files are extracted and saved. Thereafter, assume the user transparently uses UCVM 462 to run a web browser to visit web site B. As web site B is hosted by a different web domain than web site A, the previously stored cookies and cache files associated with web site A will not be injected into UCVM 462. Thereafter, if UCVM 462 is destroyed, then any cookies and cache files are extracted and saved. At a later point in time, if the user thereafter transparently uses UCVM 464 to run a web browser to visit web site A, then the previously stored cookies and cache files associated with the web domain of web site A will be injected into UCVM 464. This allows the web browser running in UCVM 464 to visit web site A to appear, to the user, to have the same state of the prior web browser used to visit web site A, even through different virtual machines are used between visits. Note that no portion of the file system is saved between visits to a web site; only the state of the web session is saved.

In one embodiment, the cookies and cache information is captured in Diff Store 1020 associated with the URL of the website. In each visit to the same URL, the UCVM utilizes the same Diff Store presenting the cookies and caches to the UCVM. In another embodiment, the cookies and cache files can be captured at the end of the session and saved to the client system's core file system in a special folder. On visiting the same URL again, the cookies and cache can be re-injected into the file system of the UCVM.

Efficient Physical-to-Virtual Disk Conversion

Platform virtualization is performed on a given hardware platform by host software (a control program), which creates a simulated computer environment, termed "a virtual machine," for its guest software. A hypervisor, also called virtual machine manager (VMM), is one of many hardware virtualization techniques that allow multiple operating systems, termed "guests," to run concurrently on a host computer. The hypervisor presents to the guest operating systems a virtual operating platform and manages the execution of the guest operating systems. A guest OS executes as if it was running directly on the physical hardware. Access to physical system resources such as the network access, display, keyboard, and disk storage is suitably virtualized so that a guest OS does not know that these are virtual devices.

Generally, there are two types of hypervisors. Type 1 (or native, bare metal) hypervisors run directly on the host's hardware to control the hardware and to manage guest operating systems. A guest operating system thus runs on another level above the hypervisor. Type 2 (or hosted) hypervisors run within a conventional operating system environment. With the hypervisor layer as a distinct second software level, guest operating systems run at the third level above the hardware. In other words, Type 1 hypervisor runs directly on the hardware; a Type 2 hypervisor runs on another operating system, such as Windows. Embodiments of the invention may use any type of hypervisor. Thus, hypervisor 420 in FIG. 4 may either be a Type 1 or a Type 2 hypervisor.

A virtual disk image (or simply "a virtual disk") is a file on a physical disk, which has a well-defined (published or proprietary) format and is interpreted by a hypervisor as a hard disk. A virtual disk image may have a specific file type extension, e.g., .vmdk for VMware VMDK, .vhd for Xen and Microsoft Hyper-V, and .vdi for Oracle VM VirtualBox.

There are two approaches employed for storage allocation by prior hypervisors, namely, (1) pre-allocate the entire storage for the virtual disk upon creation and (2) dynamically grow the storage on demand. In the former approach involving pre-allocation, the virtual disk may be implemented as either split over a collection of flat files (typically one is at least 2 GB in size) or as a single, large monolithic flat file. In the latter approach involving on-demand growth, the virtual disk may also be implemented using split or monolithic files, except that storage is allocated on demand.

There are two modes in which a disk can be mapped for use by a virtual machine. In a virtual mode, the mapped disk is presented as if it is a logical volume, or a virtual disk file, to the guest operating system and its real hardware characteristics are hidden. In a physical mode, also called the pass through mode, the hypervisor bypasses the I/O virtualization layer and passes all I/O commands directly to the disk.

A virtual machine (VM) is a software implementation of a machine (i.e. a computer) that executes programs like a physical machine. Virtual machines allow the sharing of the underlying physical machine resources between different virtual machines, each running its own operating system. The software layer providing the virtualization is called a hypervisor, such as hypervisor 420 in FIG. 4.

Virtual machines each require their own image of the operating system. The guest OS and host OS typically do not share the OS image, even if they are the same OS. This is problematic for several reasons. First, if a user wishes to run 10 different virtual machines, then she will require 10 different copies of the OS for the guest OSs, which requires an undesirable amount of storage to maintain. Second, the OS for a VM has to be created either by installing a new OS or shipping a copy of the OS from somewhere else, which is burdensome for those who do not have access to OS images. Further, it is also time consuming to install a new OS or ship an OS image, which is typically quite large. A third problem is that any software present in the host OS (such as a printer driver) will not be available in a guest OS unless it is installed again.

Figure 8:
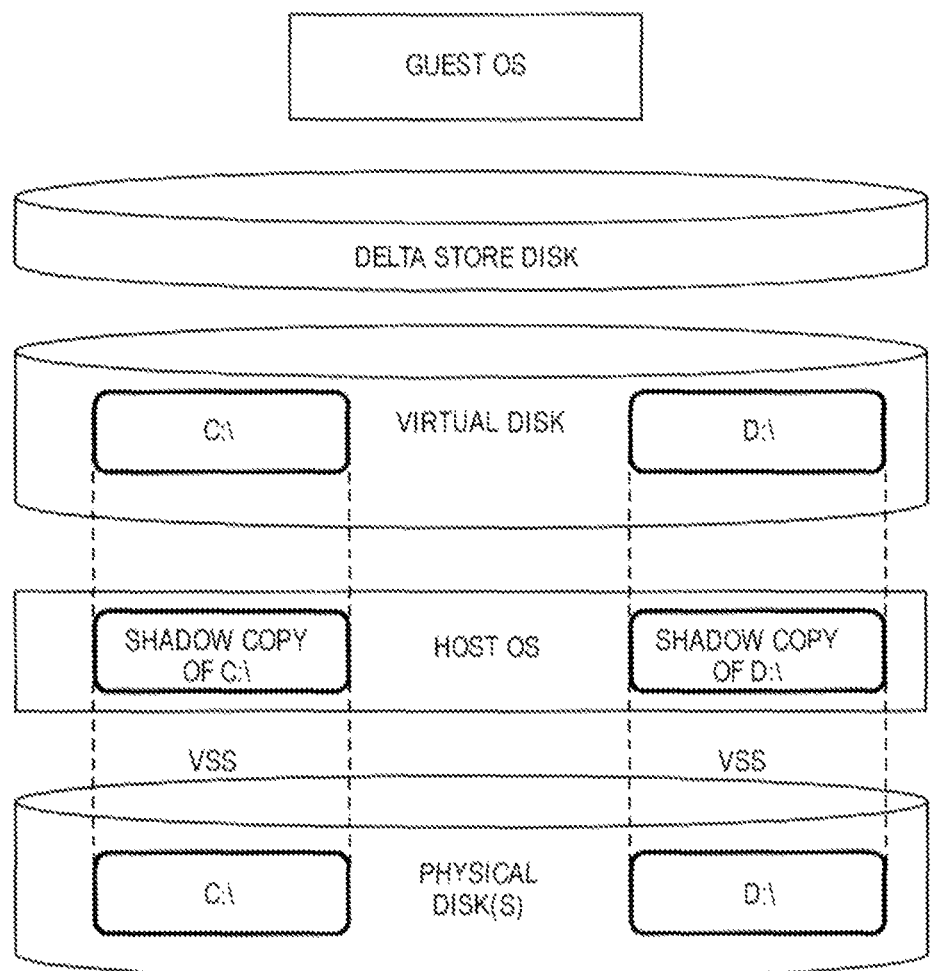
FIG. 8 is an illustration of a virtual disk based on VSS shadow copies according to an embodiment of the invention.

Embodiments of the invention enable a guest operating system to be provided to a virtual machine in a manner that overcomes the disadvantages of the prior art, such as requiring a separate operating system to be installed for each virtual machine. FIG. 8 is an illustration of a virtual disk stack according to an embodiment. FIG. 8 depicts a virtual disk stack comprising one or more physical disks upon which a host operating system is installed. The virtual disk is a physical file stored on one or more physical disks that is interpreted by a virtual machine as a physical disk.

Description of how virtual machines may be efficiently instantiated using a template may be found in U.S. nonprovisional patent application Ser. No. 13/667,750, filed Nov. 2, 2012, entitled "Instantiation of a Virtual Machine Using a Reduced Size Template," the contents of which are hereby incorporated by reference for all purposes as if fully set forth herein.

Security Afforded by Embodiments

Embodiments of the invention provide a secure environment to prevent malicious code from affecting any lasting change in a computer system. Untrusted code (either a web application or a native executable) runs inside an isolated operating system running on an isolated virtual machine. This code has no access to any other application (either a native application or a web application) being run by the user because those applications run in other operating systems running in separate virtual machines. Moreover, untrusted code has access to only the specific part of the file system that is needed for correct execution of the code. Access to additional parts of the file system has to be provided by code that runs in VM0 (which is secure and fortified against unauthorized intrusion) and any increased access needs explicit authorization from the human user.

Specific trusted code that needs to interact in a complex way with other applications may be explicitly designated to run together inside the same designated VM. This type of VM also has limited access to the file system.

All code has limited network access to just what that code needs for its correct execution. All virtual machines are created from templates stored in VM0 which are either immutable or can be updated in a very controlled fashion. Consequently, if a security bug exists in a piece of code, the effect of the security bug is isolated ("space limited") because the compromised code has access to only a limited part of the file system, the network, devices, etc. Moreover, the effect of the security bug is "time limited" because the virtual machine that has been compromised will be subsequently discarded and a new virtual machine is created for future application instances from a clean immutable VM template.

Hardware Mechanisms

Figure 11:
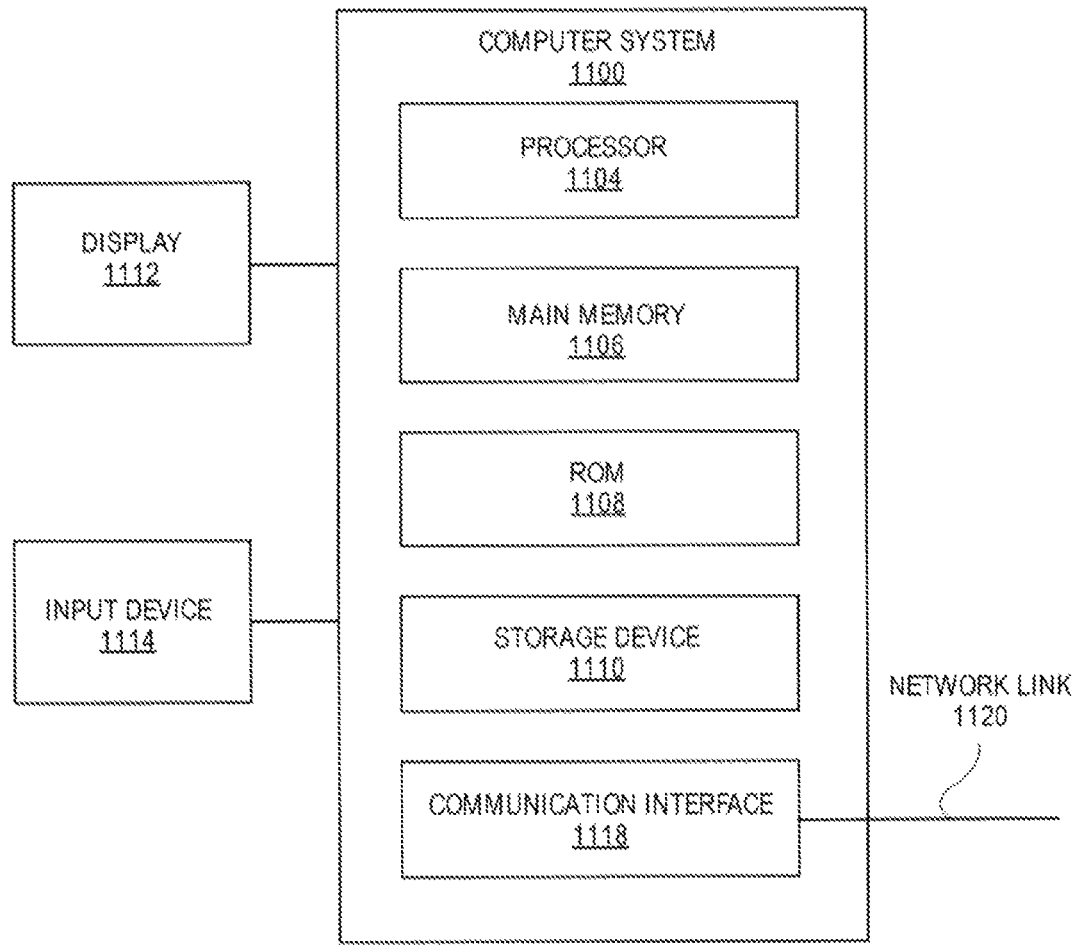
FIG. 11 is a block diagram that illustrates a computer system upon which an embodiment of the invention may be implemented.

In an embodiment, system 200 of FIG. 2 may be implemented on a computer system. FIG. 11 is a block diagram that illustrates a computer system 1100 upon which an embodiment of the invention may be implemented. In an embodiment, computer system 1100 includes processor 1104, main memory 1106, ROM 1108, storage device 1110, and communication interface 1118. Computer system 1100 includes at least one processor 1104 for processing information. Computer system 1100 also includes a main memory 1106, such as a random access memory (RAM) or other dynamic storage device, for storing information and instructions to be executed by processor 1104. Main memory 1106 also may be used for storing temporary variables or other intermediate information during execution of instructions to be executed by processor 1104. Computer system 1100 further includes a read only memory (ROM) 1108 or other static storage device for storing static information and instructions for processor 1104. A storage device 1110, such as a magnetic disk or optical disk, is provided for storing information and instructions.

Computer system 1100 may be coupled to a display 1112, such as a cathode ray tube (CRT), a LCD monitor, and a television set, for displaying information to a user. An input device 1114, including alphanumeric and other keys, is coupled to computer system 1100 for communicating information and command selections to processor 1104. Other non-limiting, illustrative examples of input device 1114 include a mouse, a trackball, or cursor direction keys for communicating direction information and command selections to processor 1104 and for controlling cursor movement on display 1112. While only one input device 1114 is depicted in FIG. 11, embodiments of the invention may include any number of input devices 1114 coupled to computer system 1100.

Embodiments of the invention are related to the use of computer system 1100 for implementing the techniques described herein. According to one embodiment of the invention, those techniques are performed by computer system 1100 in response to processor 1104 executing one or more sequences of one or more instructions contained in main memory 1106. Such instructions may be read into main memory 1106 from another machine-readable medium, such as storage device 1110. Execution of the sequences of instructions contained in main memory 1106 causes processor 1104 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "machine-readable storage medium" as used herein refers to any tangible medium that participates in storing instructions which may be provided to processor 1104 for execution. Such a medium may take many forms, including but not limited to, non-volatile media and volatile media. Non-volatile media includes, for example, optical or magnetic disks, such as storage device 1110. Volatile media includes dynamic memory, such as main memory 1106.

Non-limiting, illustrative examples of machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of machine readable media may be involved in carrying one or more sequences of one or more instructions to processor 1104 for execution. For example, the instructions may initially be carried on a magnetic disk of a remote computer. The remote computer can load the instructions into its dynamic memory and send the instructions over a network link 1120 to computer system 1100.

Communication interface 1118 provides a two-way data communication coupling to a network link 1120 that is connected to a local network. For example, communication interface 1118 may be an integrated services digital network (ISDN) card or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through a local network to a host computer or to data equipment operated by an Internet Service Provider (ISP).

Computer system 1100 can send messages and receive data, including program code, through the network(s), network link 1120 and communication interface 1118. For example, a server might transmit a requested code for an application program through the Internet, a local ISP, a local network, subsequently to communication interface 1118. The received code may be executed by processor 1104 as it is received, and/or stored in storage device 1110, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A non-transitory computer-readable storage medium that tangibly stores one or more sequences of instructions which when executed by one or more processors, cause:
    storing policy data that identifies, for a particular application executing within a virtual machine, a set of user data which may be accessed by the particular application, wherein the set of user data is personal data associated with a user that is stored within a host operating system;
    establishing the set of user data for the virtual machine based upon the policy data;
    upon instantiating the virtual machine, populating said virtual machine with said set of user data to be accessed by the particular application;
    intercepting a communication that was issued from the particular application executing on the host operating system and intended to be delivered to an intended recipient, wherein the intended recipient is executing on, or is a kernel of, the host operating system; and
    determining, based upon a policy, whether to forward the communication to the intended recipient or to route the communication to the virtual machine executing upon the same physical device as the particular application.

2. The non-transitory computer-readable storage medium of claim 1, wherein the communication is an inter-process communication (IPC) message that was intended to be delivered to a different application executing on the host operating system.

3. The non-transitory computer-readable storage medium of claim 1, wherein the communication is a system call to the kernel of the host operating system.

4. The non-transitory computer-readable storage medium of claim 1, wherein execution of the one or more sequences of instructions further causes:
    upon determining that the communication is requesting that a particular application be launched, launching the particular application within a selected virtual machine.

5. The non-transitory computer-readable storage medium of claim 1, wherein the communication is received by the particular application within the virtual machine, and wherein the virtual machine is maintained only as long as the particular application is executed.

6. The non-transitory computer-readable storage medium of claim 1, wherein the virtual machine is preventing from accessing any payment instrument data that is maintained outside of the virtual machine, and wherein the payment instrument data can be used by applications executing on the device to make an electronic payment using a payment instrument.

7. The non-transitory computer-readable storage medium of claim 6, wherein any application, executing within the virtual machine, is required to request authorization from a user of the device prior to receiving access to payment instrument data that is maintained outside of the virtual machine, and wherein the payment instrument data can be used by applications to make an electronic payment using a payment instrument.

8. The non-transitory computer-readable storage medium of claim 1, wherein the user data includes one or more of contact data, payment instrument data, location data, and diary data.

9. The non-transitory computer-readable storage medium of claim 1, wherein the user data maintained external to a first machine is first user data, and wherein execution of the one or more sequences of instructions further causes:

upon determining that the policy data forbids the particular application from
accessing any user data belonging to a user of the device, providing, to the particular application, access to default set of user data maintained internal to the virtual machine, wherein the default set of user data does not describe actual attributes of the user of the device.

10. The non-transitory computer-readable storage medium of claim 1, wherein intercepting the communication comprises:
a library file, in communication with or comprised within the particular application issuing the communication, redirecting the communication to a software component external to the host operating system.

11. The non-transitory computer-readable storage medium of claim 1, wherein intercepting the communication is accomplished by one or more of: (a) a modification to the kernel responsible for passing messages, (b) one or more breakpoint instructions or other instructions inserted into the normal flow of message passing code, (c) using existing kernel facilities to intercept system calls or function calls, (d) an engine which samples software activity frequently to deduce when the communication is sent, (e) a simulation of a network across which the communication may be passed, (f) use of hardware facilities which can monitor normal execution of the one or more processors, and (g) use of pointers and the like to refer to alternative code.

12. An apparatus, comprising:
one or more processors; and
one or more sequences of instructions which when executed by the one or more processors causes:
storing policy data that identifies, for a particular application executing within a virtual machine, a set of user data which may be accessed by the particular application, wherein the set of user data is personal data associated with a user that is stored within a host operating system;
establishing a set of user data for the virtual machine based upon the policy data; and
upon instantiating the virtual machine, populating said virtual machine with said set of user data;
intercepting a communication that was issued from the particular application executing on the host operating system and intended to be delivered to an intended recipient, wherein the intended recipient is executing on, or is a kernel of, the host operating system; and
determining, based upon a policy, whether to forward the communication to the intended recipient or to route the communication to the virtual machine executing upon the same physical device as the particular application.

13. The apparatus of claim 12, wherein the communication is an inter-process communication (IPC) message that was intended to be delivered to a different application executing on the host operating system.

14. The apparatus of claim 12, wherein the communication is a system call to the kernel of the host operating system.

15. The apparatus of claim 12, wherein execution of the one or more sequences of instructions further causes:
upon determining that the communication is requesting that a particular application be launched, launching the particular application within a selected virtual machine.

16. The apparatus of claim 12, wherein the communication is received by the particular application within the virtual machine, and wherein the virtual machine is maintained only as long as the particular application is executed.

17. The apparatus of claim 12, wherein the virtual machine is preventing from accessing any payment instrument data that is maintained outside of the virtual machine, and wherein the payment instrument data can be used by applications executing on the device to make an electronic payment using a payment instrument.

18. The apparatus of claim 12, wherein any application, executing within the virtual machine, is required to request authorization from a user of the device prior to receiving access to payment instrument data that is maintained outside of the virtual machine, and wherein the payment instrument data can be used by applications to make an electronic payment using a payment instrument.

19. The apparatus of claim 12, wherein the user data includes one or more of contact data, payment instrument data, location data, and diary data.

20. The apparatus of claim 12, wherein the user data maintained external to a first machine is first user data, and wherein execution of the one or more sequences of instructions further causes:
upon determining that the policy data forbids the particular application from accessing any user data belonging to a user of the device, providing, to the particular application, access to default set of user data maintained internal to the virtual machine, wherein the default set of user data does not describe actual attributes of the user of the device.

21. The apparatus of claim 12, wherein intercepting the communication comprises:
a library file, in communication with or comprised within the particular application issuing the communication, redirecting the communication to a software component external to the host operating system.

22. The apparatus of claim 12, wherein intercepting the communication is accomplished by one or more of: (a) a modification to the kernel responsible for passing messages, (b) one or more breakpoint instructions or other instructions inserted into the normal flow of message passing code, (c) using existing kernel facilities to intercept system calls or function calls, (d) an engine which samples software activity frequently to deduce when the communication is sent, (e) a simulation of a network across which the communication may be passed, (f) use of hardware facilities which can monitor normal execution of the one or more processors, and (g) use of pointers and the like to refer to alternative code.

23. A method for intercepting messages in a virtualized environment, comprising:
storing policy data that identifies, for a particular application executing within a virtual machine, a set of user data which may be accessed by the particular application, wherein the set of user data is personal data associated with a user that is stored within a host operating system;
establishing a set of user data for the virtual machine based upon the policy data; and
upon instantiating the virtual machine, populating said virtual machine with said set of user data
intercepting a communication that was issued from the particular application executing on the host operating system and intended to be delivered to an intended recipient, wherein the intended recipient is executing on, or is a kernel of, the host operating system; and
determining, based upon a policy, whether to forward the communication to the intended recipient or to route the communication to the virtual machine executing upon the same physical device as the particular application.

* * * * *

UNITED STATES PATENT AND TRADEMARK OFFICE
CERTIFICATE OF CORRECTION

| | |
|---|---|
| PATENT NO. | : 9,558,051 B1 |
| APPLICATION NO. | : 13/872994 |
| DATED | : January 31, 2017 |
| INVENTOR(S) | : Adrian Taylor |

It is certified that error appears in the above-identified patent and that said Letters Patent is hereby corrected as shown below:

On the Title Page

Item (73), in the Assignee:
Replace "Bormium, Inc." with --Bromium, Inc.--.

Signed and Sealed this
Fourth Day of April, 2017

Michelle K. Lee
*Director of the United States Patent and Trademark Office*